(12) United States Patent  
Kreil

(10) Patent No.: US 8,991,890 B2
(45) Date of Patent: Mar. 31, 2015

(54) SLIDE-OUT ROOM SYSTEM HAVING WALL-MOUNTED DRIVE MECHANISMS

(71) Applicant: Lippert Components Manufacturing, Inc., Elkhart, IN (US)

(72) Inventor: Craig J. Kreil, Mishawaka, IN (US)

(73) Assignee: Lippert Components Manufacturing, Inc., Elkhart, IN (US)

( * ) Notice: Subject to any disclaimer, the term of this patent is extended or adjusted under 35 U.S.C. 154(b) by 0 days.

(21) Appl. No.: 14/190,975

(22) Filed: Feb. 26, 2014

(65) Prior Publication Data

US 2014/0175822 A1   Jun. 26, 2014

Related U.S. Application Data

(63) Continuation-in-part of application No. 13/660,619, filed on Oct. 25, 2012, and a continuation-in-part of application No. 13/660,739, filed on Oct. 25, 2012, now Pat. No. 8,840,164.

(60) Provisional application No. 61/775,020, filed on Mar. 8, 2013, provisional application No. 61/664,542, filed on Jun. 26, 2012, provisional application No. 61/565,730, filed on Dec. 1, 2011, provisional application No. 61/647,908, filed on May 16, 2012, provisional application No. 61/551,719, filed on Oct. 26, 2011.

(51) Int. Cl.
  *B60P 3/34* (2006.01)

(52) U.S. Cl.
  CPC ........................................ *B60P 3/34* (2013.01)
  USPC ..................................................... 296/26.02

(58) Field of Classification Search
  CPC ............................................................ B60P 3/34
  USPC .......... 296/26.02, 26.04, 26.14, 26.12, 26.13, 296/171, 175; 74/89, 89.17
  See application file for complete search history.

(56) References Cited

U.S. PATENT DOCUMENTS

| | | |
|---|---|---|
| 1,610,065 A | 12/1926 | Meyer |
| 2,842,972 A | 7/1958 | Houdart |
| 2,965,412 A | 12/1960 | Henderson et al. |
| 3,137,041 A | 6/1964 | Mullen |
| 4,235,542 A | 11/1980 | Paterik, Jr. |

(Continued)

FOREIGN PATENT DOCUMENTS

| | | |
|---|---|---|
| EP | 0065398 A1 | 11/1982 |
| FR | 1574680 A | 7/1969 |

(Continued)

*Primary Examiner* — Pinel Romain
(74) *Attorney, Agent, or Firm* — Barnes & Thornburg LLP

(57) ABSTRACT

An apparatus for moving a slide-out room disposed in an aperture of a side wall of a vehicle from a retracted position to an extended position in a drive direction. The apparatus includes a drive assembly supported by the side wall of the vehicle and a driven assembly driven by the drive assembly. The driven assembly is connected to a wall of the slide-out room such that the slide-out room moves with the driven assembly from the retracted position to the extended position in the drive direction and the driven assembly is movable in a transverse direction generally perpendicular to the drive direction relative to the wall of the slide-out room. The room is extended and retracted horizontally and moved between upper and lower positions vertically in a square Z or square h pattern.

24 Claims, 28 Drawing Sheets

(56) References Cited

U.S. PATENT DOCUMENTS

| | | | |
|---|---|---|---|
| 4,667,932 A | 5/1987 | Arbeloa | |
| 5,248,180 A | 9/1993 | Hussaini | |
| 5,577,351 A | 11/1996 | Dewald, Jr. et al. | |
| 5,620,224 A | 4/1997 | DiBiagio et al. | |
| 5,706,612 A | 1/1998 | Tillett | |
| 5,758,918 A | 6/1998 | Schneider et al. | |
| 5,787,650 A * | 8/1998 | Miller et al. | 52/67 |
| 5,902,001 A | 5/1999 | Schneider | |
| 5,984,396 A | 11/1999 | Schneider | |
| 6,052,952 A | 4/2000 | Frerichs et al. | |
| 6,108,983 A | 8/2000 | Dewald, Jr. et al. | |
| 6,116,671 A | 9/2000 | Schneider | |
| 6,182,401 B1 | 2/2001 | McManus et al. | |
| 6,202,362 B1 | 3/2001 | McManus et al. | |
| 6,209,477 B1 | 4/2001 | Biedenweg | |
| 6,234,566 B1 | 5/2001 | Cyr et al. | |
| 6,325,437 B2 | 12/2001 | Hiebert et al. | |
| 6,575,514 B2 | 6/2003 | McManus et al. | |
| 6,619,713 B2 | 9/2003 | Eichhorn | |
| 6,729,669 B2 | 5/2004 | McManus et al. | |
| 6,783,164 B2 | 8/2004 | Bortell | |
| 6,802,555 B2 | 10/2004 | Yoder et al. | |
| 6,948,754 B2 | 9/2005 | Huffman et al. | |
| 7,198,320 B2 | 4/2007 | Rasmussen | |
| 7,204,536 B2 | 4/2007 | Kunz | |
| 7,234,747 B2 | 6/2007 | Rasmussen | |
| 7,293,814 B2 | 11/2007 | Blodgett, Jr. | |
| 7,316,439 B1 | 1/2008 | Crean | |
| 7,354,088 B2 | 4/2008 | Garceau et al. | |
| 7,367,171 B2 | 5/2008 | Bertram et al. | |
| 7,370,900 B1 | 5/2008 | Blodgett, Jr. | |
| 7,527,313 B2 | 5/2009 | Peter | |
| 7,802,834 B2 | 9/2010 | Cadena et al. | |
| 7,874,604 B2 | 1/2011 | Dixon et al. | |
| 8,016,343 B2 | 9/2011 | Schwindaman et al. | |
| 2002/0084663 A1 | 7/2002 | McManus et al. | |
| 2002/0180232 A1 | 12/2002 | Schneider et al. | |
| 2004/0066060 A1 | 4/2004 | Rasmussen | |
| 2004/0130172 A1 * | 7/2004 | Yoder et al. | 296/26.01 |
| 2005/0225109 A1 | 10/2005 | Schneider | |
| 2005/0230989 A1 | 10/2005 | Nebel | |
| 2006/0219314 A1 | 10/2006 | Bertram et al. | |
| 2008/0265618 A1 | 10/2008 | Cadena et al. | |
| 2008/0284191 A1 * | 11/2008 | Schultz et al. | 296/26.13 |
| 2011/0024706 A1 | 2/2011 | Schwindaman et al. | |
| 2011/0025091 A1 | 2/2011 | Schwindaman et al. | |
| 2011/0156430 A1 | 6/2011 | Gardner | |

FOREIGN PATENT DOCUMENTS

| | | |
|---|---|---|
| WO | 9856613 A1 | 12/1998 |
| WO | 0220309 A2 | 3/2002 |

* cited by examiner

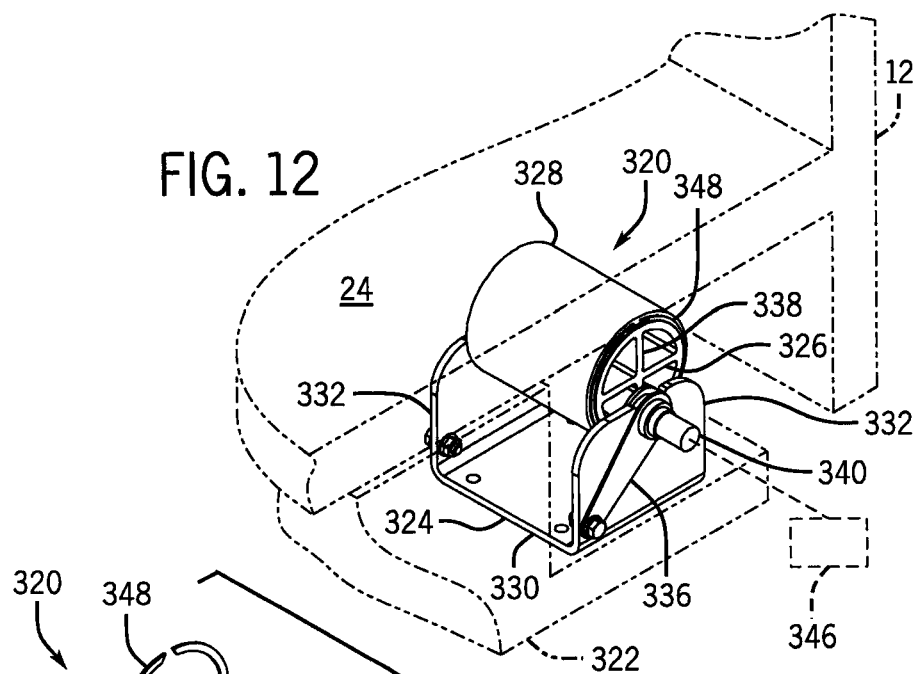
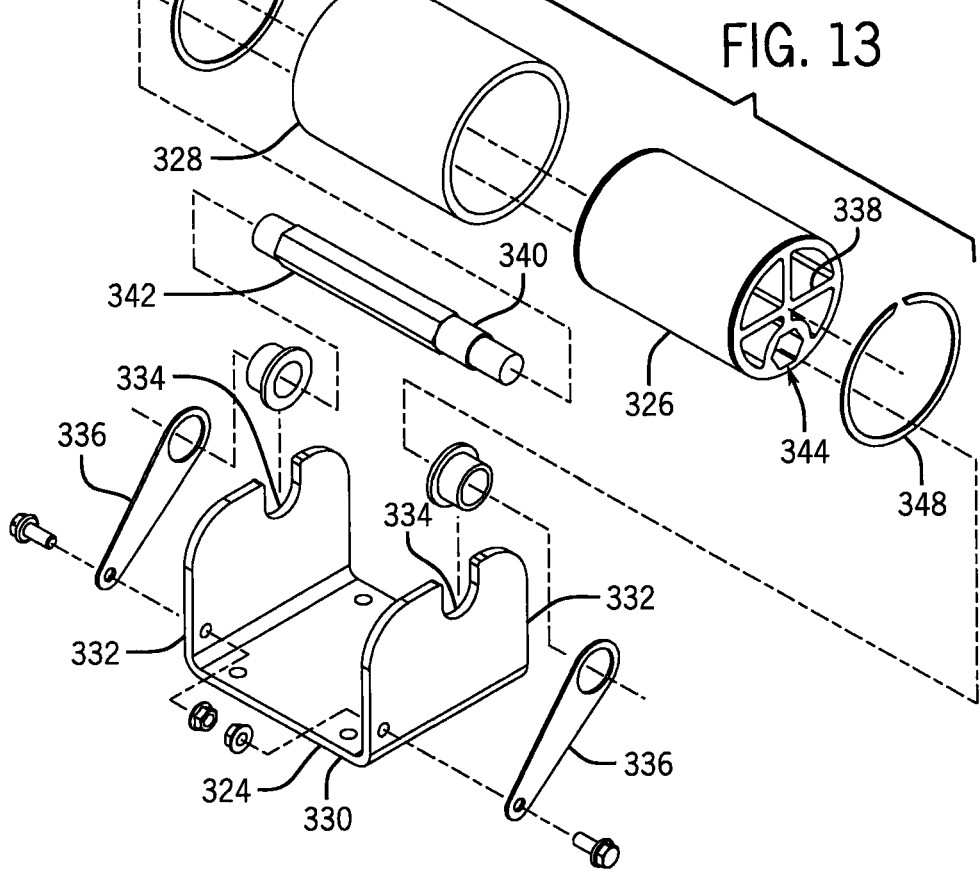

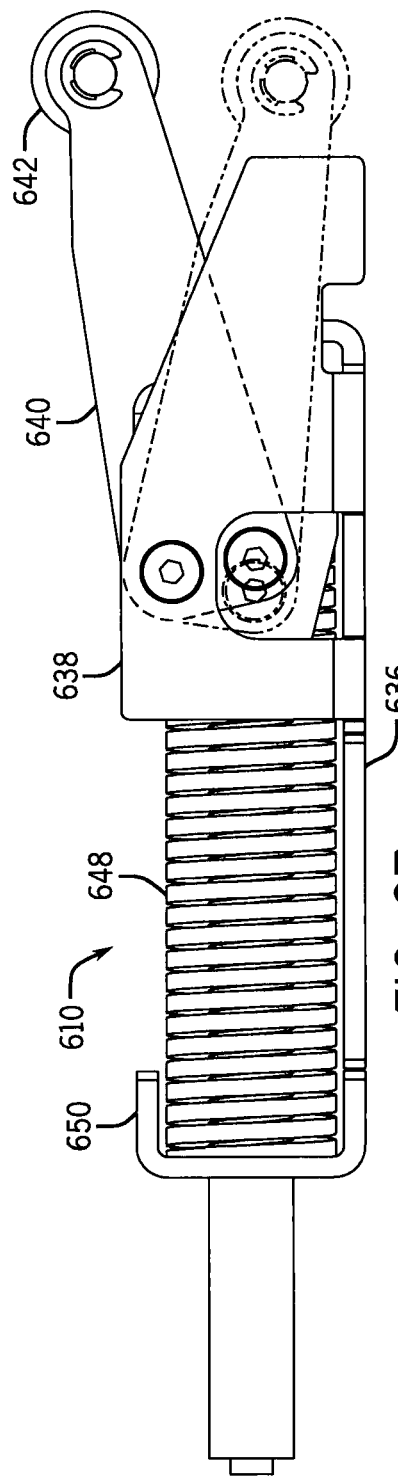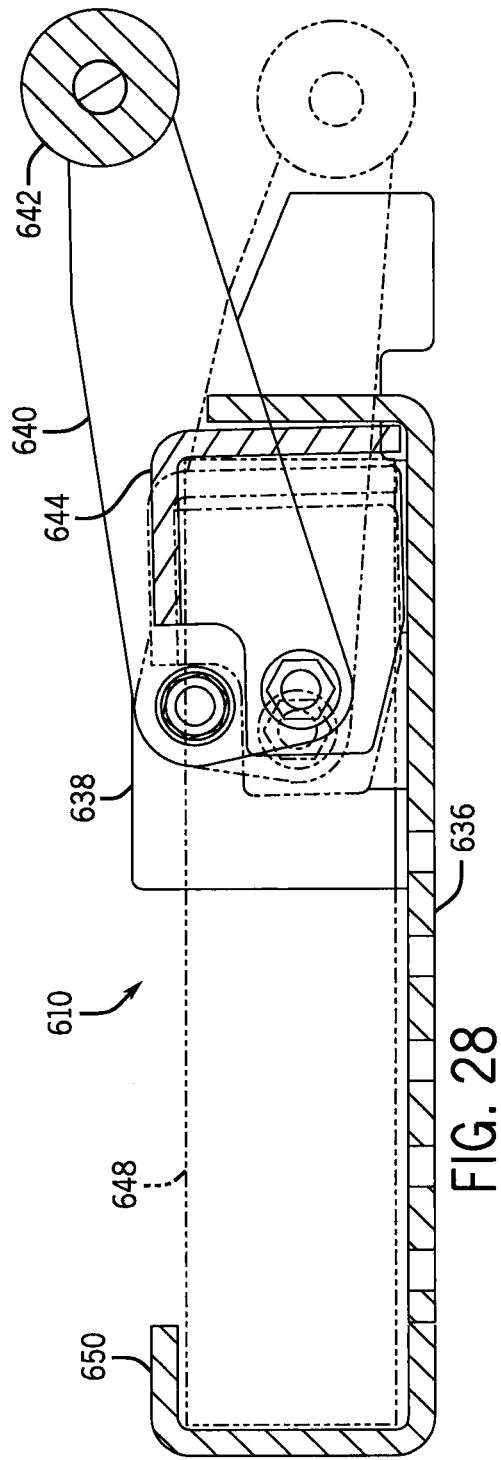

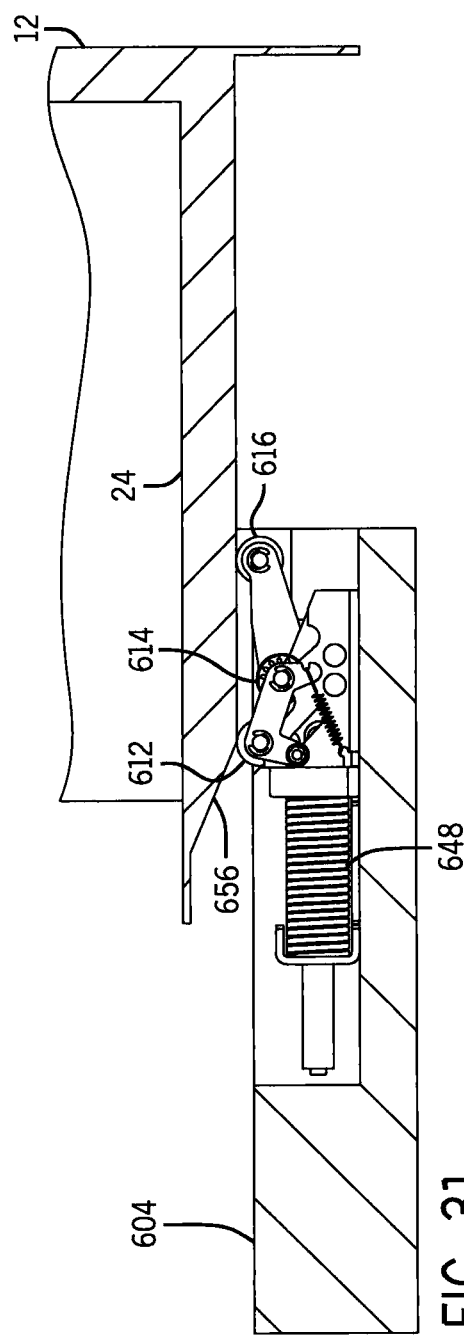
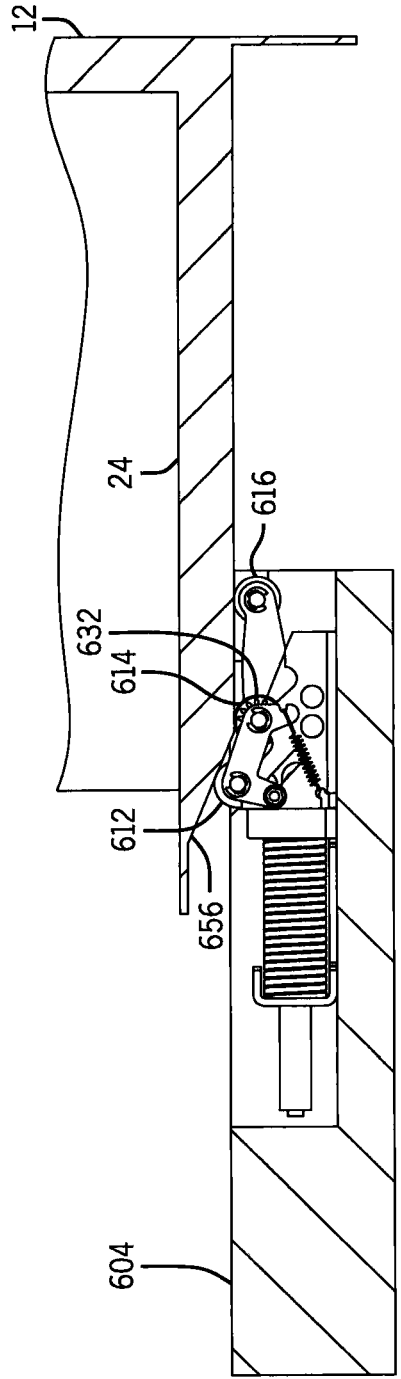
FIG. 31
FIG. 32

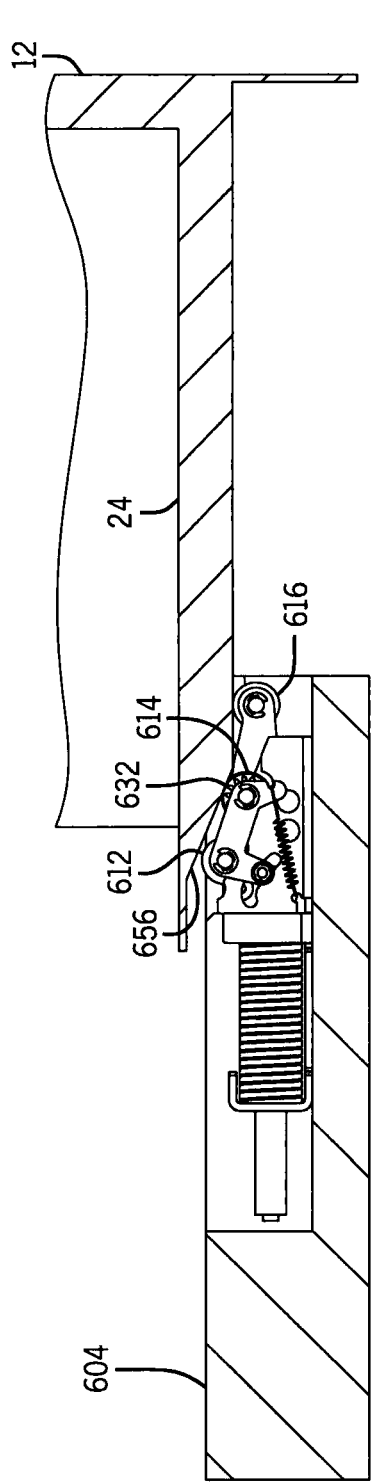
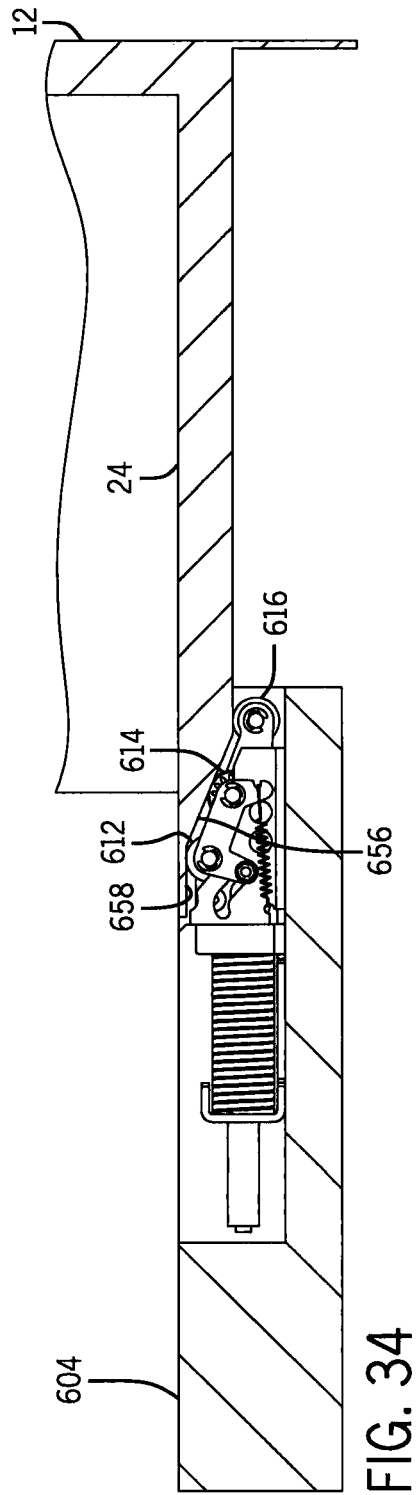

SLIDE-OUT ROOM SYSTEM HAVING WALL-MOUNTED DRIVE MECHANISMS

CROSS-REFERENCE TO RELATED APPLICATIONS

This application claims the benefit of U.S. Provisional Application No. 61/775,020 filed Mar. 8, 2013, and is a continuation-in-part of U.S. patent application Ser. No. 13/660,619 filed Oct. 25, 2012, and U.S. patent application Ser. No. 13/660,739 filed Oct. 25, 2012, which claim the benefit of U.S. Provisional Patent Application No. 61/664,542 filed Jun. 26, 2012, U.S. Provisional Patent Application No. 61/647,908 filed May 16, 2012, U.S. Provisional Patent Application No. 61/565,730 filed Dec. 1, 2011, and U.S. Provisional Patent Application No. 61/551,719 filed Oct. 26, 2011, the disclosures of all of which are hereby incorporated by reference for all purposes.

STATEMENT REGARDING FEDERALLY SPONSORED RESEARCH OR DEVELOPMENT

Not applicable.

FIELD OF THE INVENTION

This invention generally relates to slide-out rooms of recreational vehicles, and more particularly, slide-out rooms having multiple compact wall-mounted drive mechanisms.

BACKGROUND OF THE INVENTION

Some recreational vehicles include extendable slide-out rooms to increase the size of the living quarters while also providing an appropriate size for highway travel. Such slide-out rooms are driven by various types of mechanisms, such as hydraulic cylinders, electric drive screws, or rack-and-pinion gear drives. Rack-and-pinion drive mechanisms sometimes connect to a recreational vehicle within the aperture in which the slide-out room moves. These slide-out mechanisms are considered aesthetically pleasing because the components, except for the gear racks mounted to the side walls of the slide-out room, are relatively inconspicuous.

Nevertheless, wall mounted rack-and-pinion drive mechanisms have several drawbacks. For example, the side walls that mount the gear racks are typically skewed (that is, not parallel) relative to the direction in which the room moves or each other due to manufacturing tolerances. As such, the gear racks are typically skewed relative to the drive direction, which in turn may cause several problems. First, the gear racks may simply move away from and disengage the pinions as the slide-out room moves. Second, if the drive mechanism includes some type of feature that attempts to hold the gear rack in engagement with the pinion (for example, a pinion support bracket that engages the gear rack), the slide-out room wall may bend or deform because the rack urges it away from its manufactured position.

Some designs have attempted to address the above problems. These designs typically include a pinion mounting bracket that is movably mounted to the vehicle in a transverse direction (that is, a direction perpendicular to the drive direction). As such, the pinion moves relative to the vehicle and remains in engagement with the gear rack even if the gear rack is skewed relative to the drive direction.

However, these designs introduce yet another problem. To permit the mounting bracket and pinion to move in the transverse direction, a small clearance space (about 0.5 inch) is provided in the transverse direction between the bracket and a channel that houses the bracket. As such, the pinion mounting bracket, the gear racks, and the slide-out room may shift in the transverse direction as the vehicle moves. In particular, when the vehicle comes to a stop, the large mass of the room may cause the room to shift over the clearance space, and the pinion mounting bracket may abruptly strike the support channel. Such an action could damage the drive mechanism and could be relatively loud for the vehicle's occupants.

This problem is difficult to address because of the pinion mounting bracket's position within the support channel. Furthermore, even if the mounting bracket can be accessed, fixing the bracket in the transverse direction again causes the original problem of the gear rack disengaging the pinion.

As another example of the limitations of rack-and-pinion drive mechanisms, the components that support the weight of the slide-out room are also disposed within the aperture and are typically relatively small due to the limited space. These small supports can only carry a relatively small load, which essentially limits wall mounted rack-and-pinion mechanisms to use with relatively small and light slide-out rooms. Similarly, the weight of the slide-out room is transmitted to the supports from the rack, which is in turn supported by one of the slide-out room walls. The slide-out room walls typically comprise a light-weight (and low-strength) material such as wood and, as such, the slide-out room walls can only carry a relatively small load. This again limits wall mounted rack-and-pinion mechanisms to use with relatively small and light slide-out rooms.

Another drawback of wall mounted rack-and-pinion mechanisms is that the slide-out room typically only moves horizontally between the retracted position and the extended position and vice versa. As such, the slide-out room cannot act as a so-called "flush floor" room in which the floor of the slide-out room moves downwardly and is level with the floor of the vehicle in the extended position to eliminate the step between the vehicle and slide-out room.

As yet another example of the limitations of rack-and-pinion drive mechanisms, a speed reducer (for example, a gearbox) connecting a drive motor to the pinion is not sufficient for inhibiting unintentional movement of the slide-out room while the vehicle travels, or to maintain the seals in compression over extended periods of time when the vehicle is parked. That is, the speed reducer provides a relatively large reduction ratio and is difficult to back-drive. Nevertheless, the speed reducer may be back-driven by the large forces imparted by the slide-out room when the vehicle accelerates or turns, or wind or other lateral forces applied to the vehicle over time even if stationary. As such, the slide-out room may unintentionally move out or in.

Therefore, what is needed is a slide-out room drive mechanism that addresses one or more of the drawbacks described above.

SUMMARY OF THE INVENTION

The invention provides an in-wall drive mechanism for a flat floor slide-out system. The slide-out room is disposed in an aperture of a side wall of a vehicle and is movable from an upper retracted position to a lower extended position. A drive assembly is supported by the side wall of the vehicle and a driven assembly driven by the drive assembly is connected to a wall of the slide-out room. The slide-out room moves with the driven assembly generally horizontally from the retracted position to the extended position in the drive direction is movable in a generally vertical direction transverse to the drive direction relative to the wall of the vehicle. The driven assembly is moved in the generally vertical direction from an upper position at full retraction to a lower position at full extension.

In one preferred aspect, the driven assembly is moved vertically between the upper position and the lower position while horizontal movement of the room is stopped.

In another preferred aspect, the drive assembly includes a drive support along a side of the room that moves generally vertically with the room.

In another aspect, the drive assembly includes a pinion that moves generally vertically with the room. The pinion may slide vertically along its drive shaft to do so.

In another preferred aspect, the apparatus compensates for variations in spacing between the wall of the slide-out room and a perimeter of an opening in the side wall of the vehicle in which the slide-out room moves that occur as the slide-out room moves.

In another preferred aspect, the room is lowered and lifted by a mechanism that resides under the floor of the slide-out room. The room is preferably guided and stabilized by the drive and driven mechanisms at the sides of the room and in the side edges of the opening of the stationary wall of the vehicle.

In another preferred aspect; the present invention provides for extending a slide-out room in a flat floor mechanism in which the room is lowered to the floor level of the vehicle without applying shear stresses on the gaskets.

In another preferred aspect, applying an in-wall mounted mechanism of the invention to a flush floor room provides versatility in the sequence of operation in going between the retracted elevated position and the extended lowered position. In one aspect, the sequence may be, starting from full retraction, to extend the slide-out room to a position nearly fully extended but that is just short of compressing the gaskets, then drop the room and then extend the rest of the way to compress the interior gaskets. This produces a motion that is shaped like a square Z.

In an alternative sequence of operation, from full retraction, the room is extended fully to compress the gaskets and stall the extension and then retract the room a small distance to decompress the gaskets, then drop the room, and then extend once again to compress the gaskets. This produces a motion that is like a square lower case h in shape.

A third alternative is to extend all the way and then drop, although this would require special gasketing considerations as typical gaskets are not made to slide in shear as would be the case with typical gaskets with this L-shaped motion. For example, the gasket could be inflatable, with the gaskets inflated after the motion to the fully extended, lowered position has occurred, and deflation prior to beginning retraction.

The foregoing and other advantages of the invention will appear in the detailed description which follows. In the description, reference is made to the accompanying drawings which illustrate a preferred embodiment of the invention.

BRIEF DESCRIPTION OF THE DRAWINGS

FIG. 5 is a detail side section view of the drive mechanism within line 5-5 of FIG. 4;

FIG. 12 is a perspective view of a roller mechanism supporting the slide-out room of FIG. 1;

FIG. 13 is an exploded perspective view of the roller mechanism of FIG. 12;

FIG. 27 is a side view of a biasing assembly of the support mechanism along line 27-27 of FIG. 25 in the slide-out room's retracted position; the biasing assembly is shown in phantom in the slide-out room's extended position;

FIG. 28 is a section view of the biasing assembly along line 28-28 of FIG. 25 in the slide-out room's retracted position; the biasing assembly is shown in phantom in the slide-out room's extended position;

FIG. 31 is another section view of the slide-out room moving toward the extended position;

FIG. 32 is another section view of the slide-out room moving toward the extended position;

FIG. 33 is another section view of the slide-out room moving toward the extended position;

FIG. 34 is another section view of the slide-out room moving toward the extended position;

DETAILED DESCRIPTION OF THE PREFERRED EMBODIMENT

Drive mechanisms for a slide-out room system according to the present invention are supported within the aperture of a vehicle. These mechanisms include gear racks that are movable relative to the slide-out room's walls. Such a construction permits use of other components or features that inhibit the slide-out room from shifting as the vehicle moves. Furthermore, in some embodiments, these mechanisms do not support the weight of the slide-out room and are configured to move or "float" vertically relative to the vehicle. This motion permits the slide-out room to descend near the extended position such that the floor of the slide-out room is flush with the floor of the vehicle. These aspects of the invention are described in further detail in the following paragraphs, beginning with the general structure of the vehicle, the drive mechanisms, support mechanisms that permit the slide-out room to descend near the extended position, and concluding with various alternative embodiments.

Figure 1:
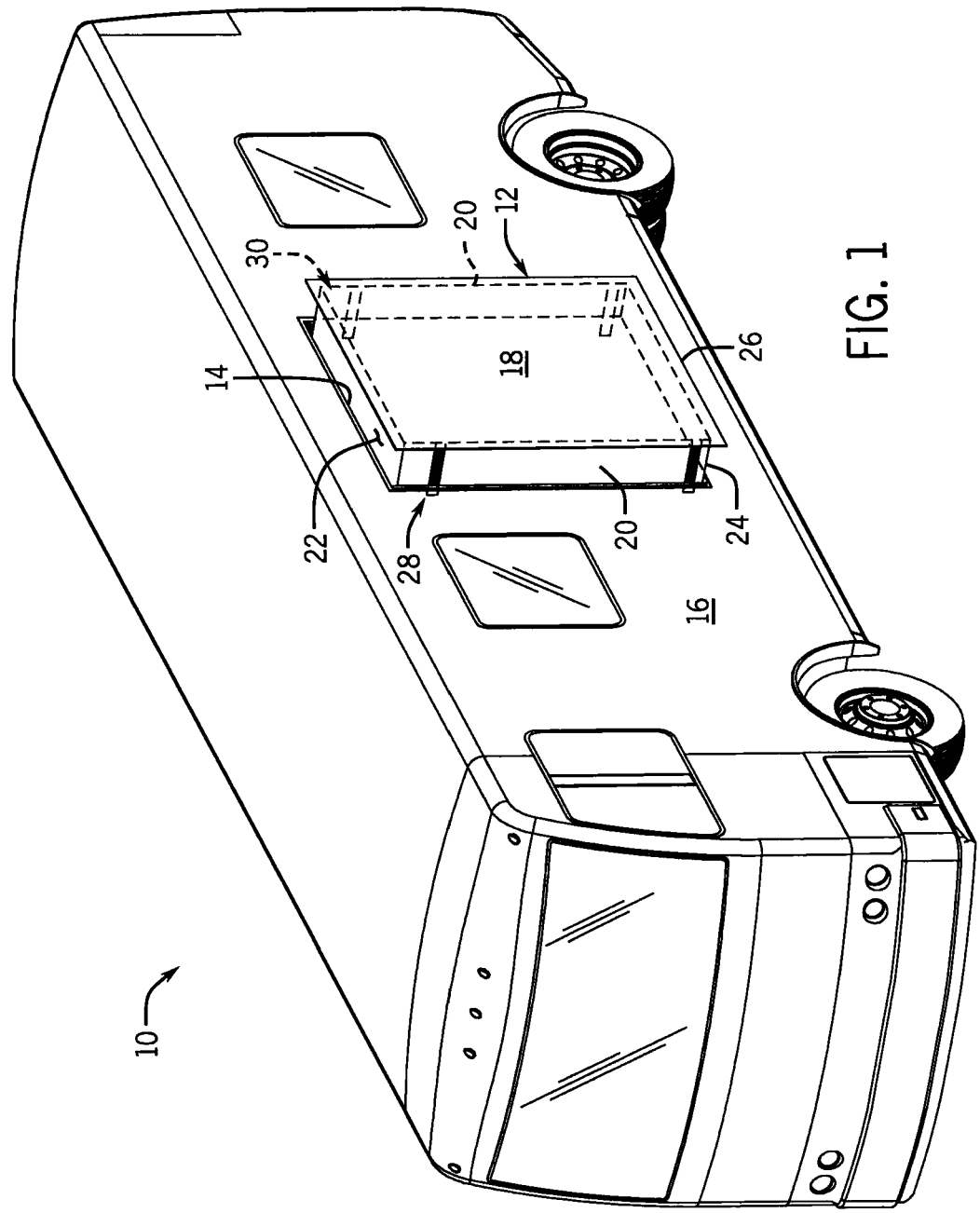
FIG. 1 is a perspective view of a recreational vehicle with a slide-out room system according to the present invention.
Figure 2:
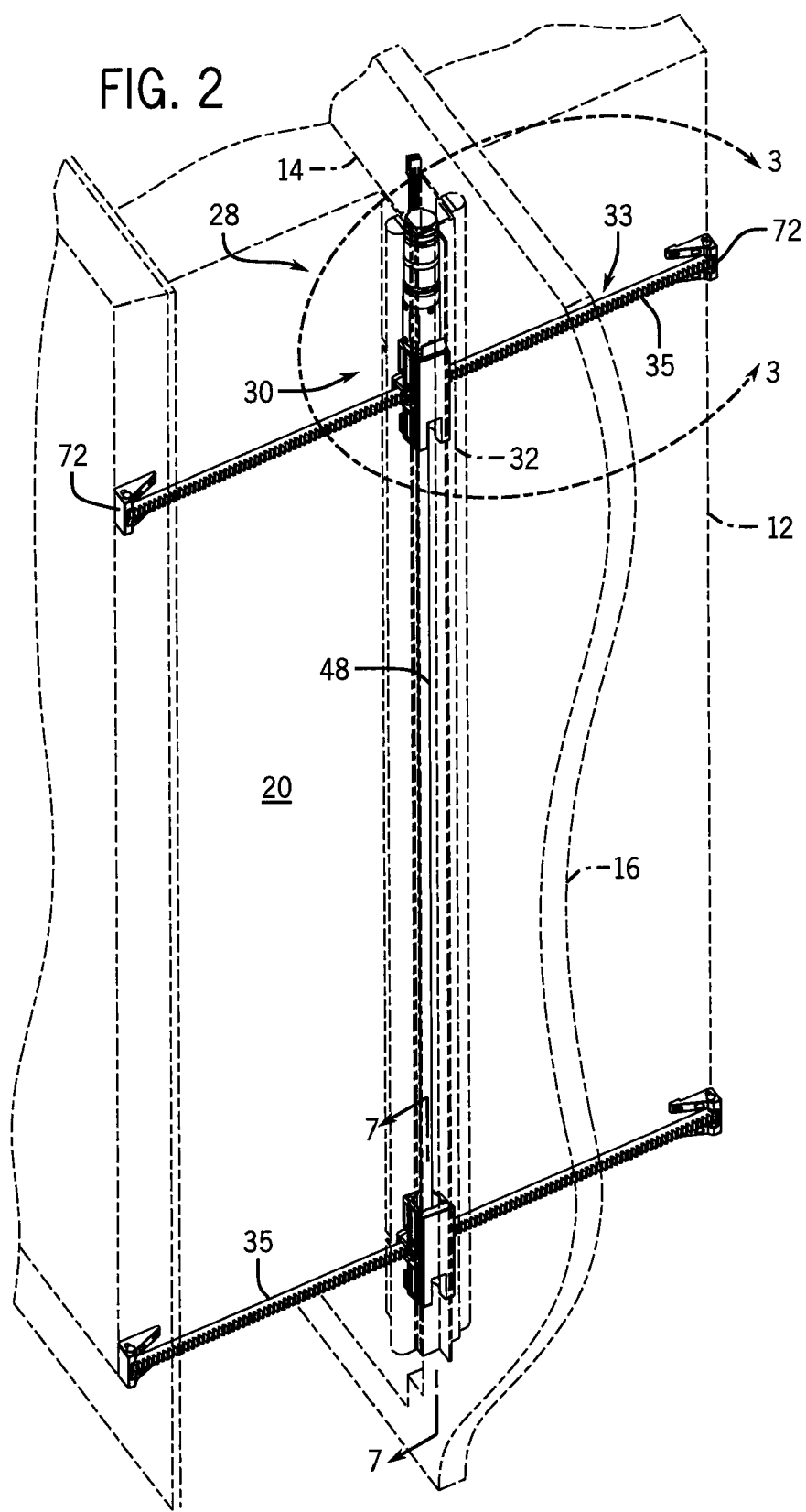
FIG. 2 is a detail perspective view of a drive mechanism of the slide-out room system of FIG. 1.

Referring first to FIGS. 1 and 2, a recreational vehicle 10 supports a slide-out room 12 in an aperture 14 of a vehicle side wall 16. An interior of the slide-out room 12 is defined by a leading or outside wall 18, side walls 20, a ceiling 22, and a floor 24. The leading wall 18 includes a fascia 26, and the plane of the fascia 26 is parallel to the respective planes of the aperture 14 and the side wall 16. The surface of the fascia 26 facing the side wall 16 includes a seal (not shown). The seal is compressed between the fascia 26 and the side wall 16 when the slide-out room 12 is retracted to prevent leaks between the cabin of the recreational vehicle 10 and the outside environment. The side walls 20 of the slide-out room 12 also include flanges (not shown) located inside the vehicle 10. The surface of the flanges facing the side wall 16 also includes a seal (not shown) to prevent leaks between the cabin of the recreational vehicle 10 and its environment when the slide-out room 12 is extended.

The slide-out room 12 is moved in a drive direction between the extended and retracted positions by two drive mechanisms 28 and 30 (FIG. 1), and one of the drive mechanisms 28 and 30 connects to each of the side walls 20. The drive mechanisms 28 and 30 are generally identical except for being disposed in mirrored relation to one another. As such, only the drive mechanism 30 will be described below for simplicity.

Referring to FIGS. 2-9, the slide-out room drive mechanism 30 generally includes a drive assembly or pinion assembly 31 that is partially disposed in a support channel 32 positioned in the aperture 14 of the vehicle side wall 16. The drive assembly 31 drives a driven assembly 33 (which generally includes a rack 35 as described in further detail below) connected to one of the side walls 20 of the slide-out room 12. As shown most clearly in FIG. 2, the drive mechanism 30 includes upper and lower sections that are disposed adjacent upper and lower sections of the slide-out room side wall 20, respectively.

Figure 3:
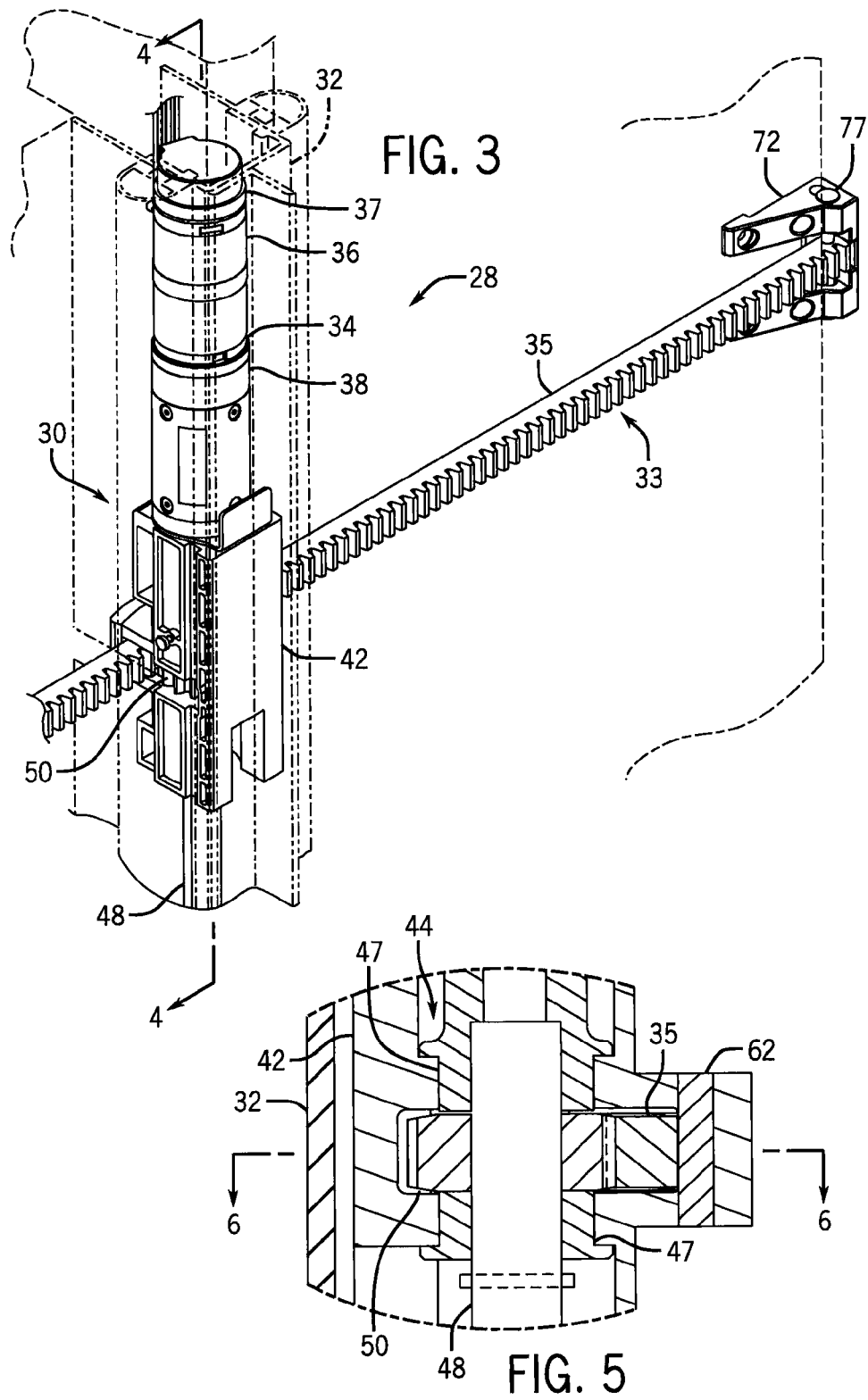
FIG. 3 is a detail perspective view of the drive mechanism within line 3-3 of FIG. 2.
Figure 4:
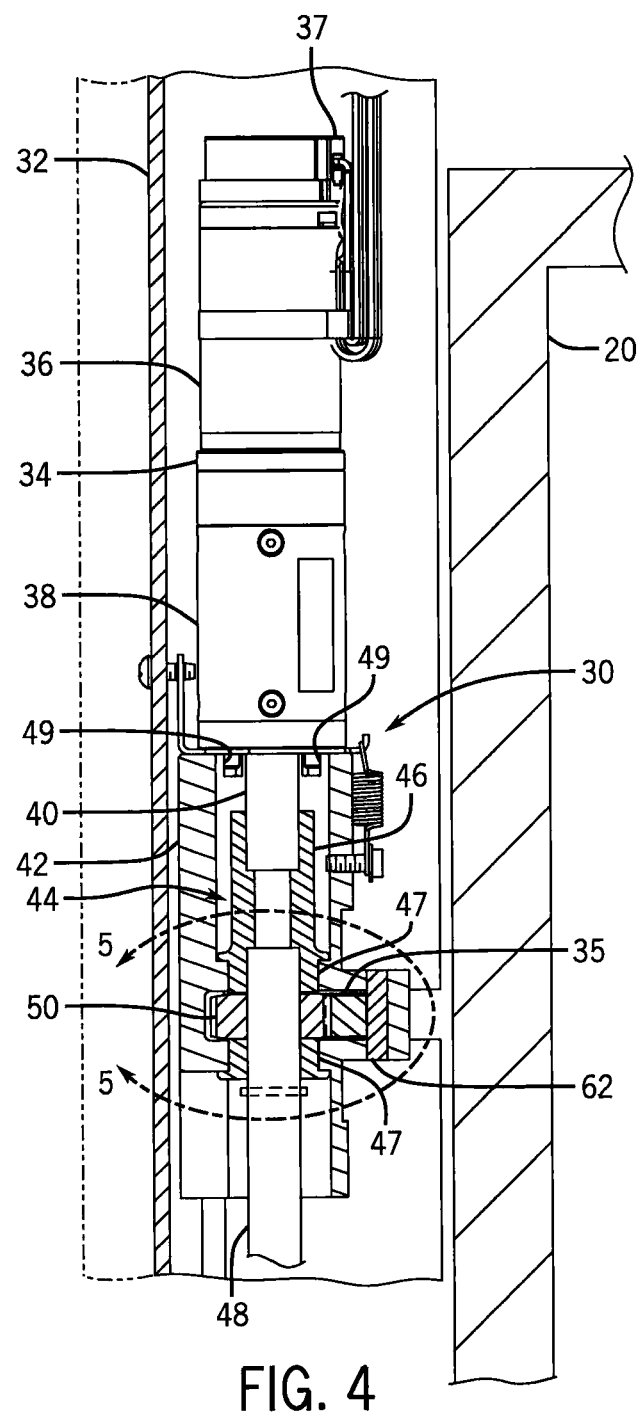
FIG. 4 is a side section view of an upper section of the drive mechanism along line 4-4 of FIG. 3.

Referring specifically to FIGS. 3-5 and turning first to the upper section, the drive mechanism 30 includes a prime mover 34 that receives power from a dedicated battery (not shown), the vehicle's alternator (not shown), or the like. The prime mover 34 may include a high-speed permanent magnet or brushless 12V DC motor 36 or the like. In some embodiments, the motor 36 includes a rotary encoder (e.g., a Hall effect rotary encoder) and/or dynamic brakes 37 that are operatively connected to the same electrical circuit as the motor 36. Such dynamic brakes 37 automatically engage when power to the motor 36 is interrupted.

Alternatively, the dynamic brakes 37 may be replaced by other types of brakes that are adapted to arrest movement of the drive mechanism 30. The brake 37 prevents the drive train from moving in the reverse direction and thus maintains the gasket seals in a compressed state in the retracted position and/or the extended position of the room 12. When in the retracted position, this also inhibits the room 12 from moving in the direction of vehicle travel due to inertia (e.g., when the vehicle 10 abruptly slows or stops) because of friction of the gasket seals in compression.

The prime mover 34 further includes a speed reducer 38, such as a planetary gear transmission, a spur gear transmission, or the like, driven by the motor 36 and having a rotatable output shaft 40 (FIG. 4). The speed reducer 38 significantly reduces the rotational speed provided by the motor 36 and significantly increases the torque. An appropriate torque may be determined based on the size and weight of the slide-out room 12. Appropriate prime movers 34 including the motor 36, the dynamic brakes 37, and the speed reducer 38 are available from Merkle-Korff Industries of Elk Grove Village, Ill. Other appropriate prime movers 34 are available from Rexnord Corporation of Milwaukee, Wis., Stature Electric, Inc. of Watertown, N.Y., and the like.

Figure 6:
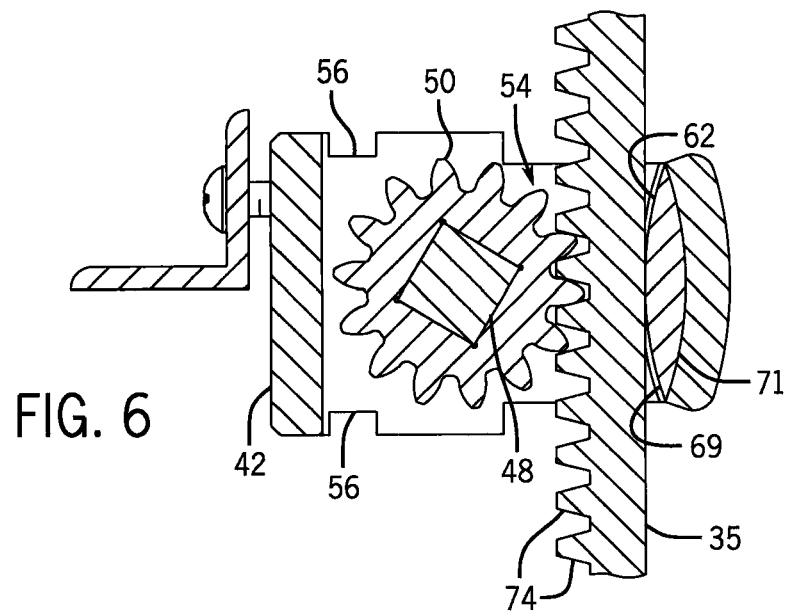
FIG. 6 is a top section view of the drive mechanism along line 6-6 of FIG. 5.
Figure 7:
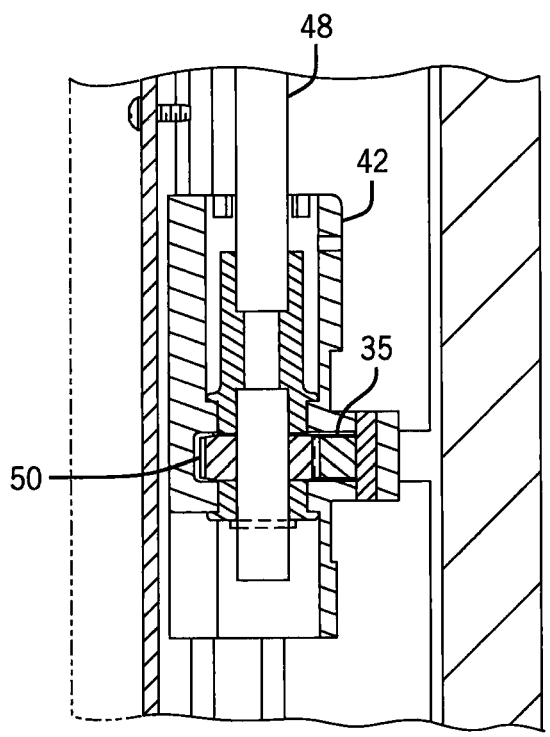
FIG. 7 is a side section view of a lower section of the drive mechanism of FIG. 2.

Turning to FIGS. 4-6, the motor 36 and the speed reducer 38 are supported by a drive support 42 disposed therebelow. The drive support 42 may comprise various materials, such as molded plastics, machined metal, or the like. Internally, the drive support 42 is hollow and defines a passageway 44 that receives a combined coupling/bushing 46 connecting the output shaft 40 to a drive shaft 48 (e.g., a square cross-sectional drive shaft). Within the passageway 44, the combined coupling/bushing 46 and a lower bushing 47 support the drive shaft 48. Vertically near the middle of the drive support 42, the passageway 44 is sized to receive a pinion gear 50 supported by the drive shaft 48. The passageway 44 also has an opening 54 (FIG. 6) to permit the pinion 50 to engage the driven assembly 33, specifically the rack 35, which will be described in further detail below.

Externally, the surfaces of the drive support 42 engage several components. For example, the drive support 42 includes an upper surface that abuts a mounting bracket 49 connected to the prime mover 34. The mounting bracket 49 is connected to the drive support 42 via an extension spring 51 fastened to the drive support 42.

In addition, the side surfaces of the drive support 42 are not fixedly connected to the support channel 32. Instead, the side surfaces of the drive support 42 include keyways 56 (FIG. 6) that extend in the longitudinal direction of the support channel 32 and receive keys (not shown) on the inner sides of the support channel 32. As shown in the figures, the keyways 56 have square cross-sectional shapes, although other shapes may be used provided that they permit the drive support 42 to "float" in the longitudinal direction of the support channel 32 (that is, to move in an "elevation" or vertical direction generally perpendicular to the drive direction). This ability to "float" permits the slide-out room 12 to act as a "flush floor" room in some embodiments and ensures the weight of the slide-out room 12 is supported by relatively strong components spaced apart from the drive mechanism 30. That is, rollers disposed on the underside of the room 12 support the weight of the slide-out room 12 whether it acts as a flush floor room or a non-flush floor room (i.e., a "flat floor" room; see FIG. 19 and the associated description). This aspect is described in further detail below.

The front face of the drive support 42 includes a mounting support 62 that is disposed proximate the opening 54 and between the pinion gear 50 and the slide-out room wall 20. The mounting support 62 also engages the rack 35 and is disposed between the rack 35 and the slide-out room wall 20. As such, the mounting support 62 inhibits the rack 35 from disengaging the pinion gear 50. Furthermore, the mounting support 62 may include front and rear convex surfaces 69 and 71 that generally face in a transverse direction (i.e., a direction generally perpendicular to both the drive direction and the elevation direction, or the direction of vehicle movement over the road). The convex surfaces 69 and 71 advantageously reduce friction forces between the mounting support 62 and the rack 35 and, similarly, permit the rack 35 to be skewed relative to the slide-out room side walls 20.

Figure 8:
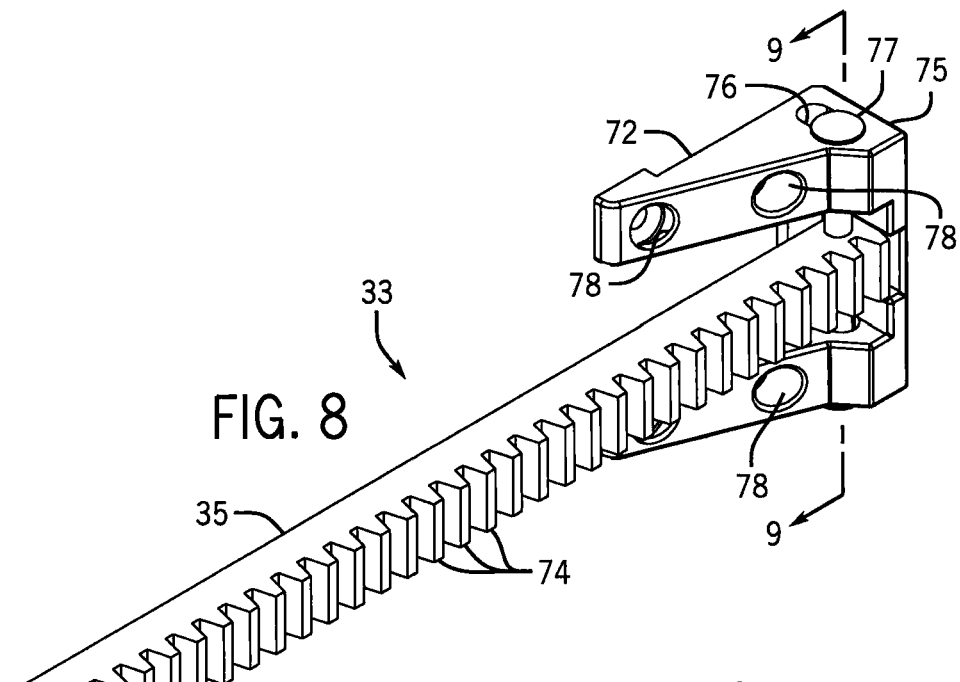
FIG. 8 is a detail perspective view of a driven assembly of the drive mechanism of FIG. 2.
Figure 9:
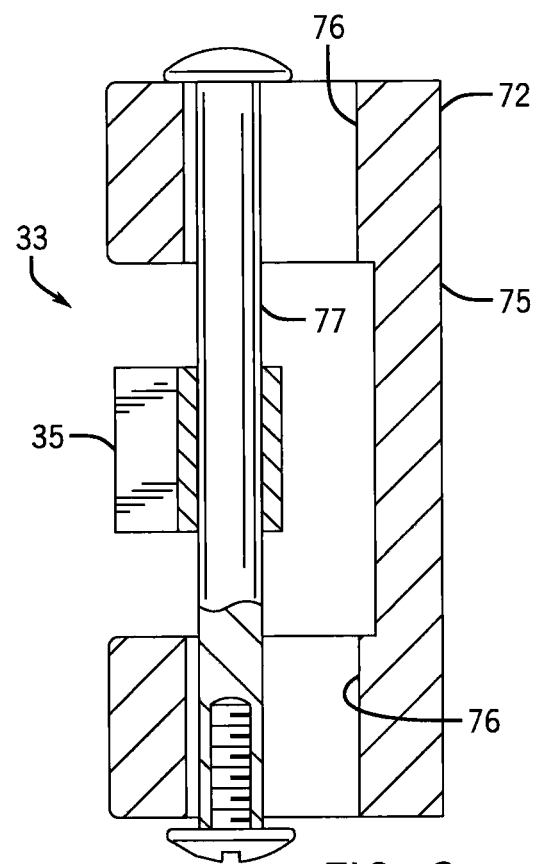
FIG. 9 is a side section view of the drive assembly along line 9-9 of FIG. 8.

Referring specifically to FIGS. 3, 8, and 9, the driven assembly 33 includes the rack 35 and two room engaging brackets 72 secured to the side wall 20 and supporting opposite ends of the rack 35. The rack 35 is a generally elongated component in the drive direction and may comprise various materials, such as hobbed aluminum or the like. The rack 35 also includes a plurality of gear teeth 74 that engage teeth of the pinion gear 50 and permit the rack 35 to be driven by the pinion gear 50.

The room engaging brackets 72 each have a horseshoe-like shape as viewed in the transverse direction. A base 75 of each bracket 72 includes transversely-elongated slots 76 for receiving pins 77 extending in the elevation direction and connecting the rack 35 to the bracket 72. This "pin-in-slot" connection permits the rack 35 to move in the transverse direction as the slide-out room 12 moves in the drive direction.

Each bracket 72 also includes a plurality of through holes 78 for receiving fasteners (not shown) that connect the bracket 72 to the slide-out room wall 20.

Turning again to FIGS. 2 and 7, the drive shaft 48 extends below the drive support 42 to the lower section of the drive mechanism 30. In general, the lower section of the drive mechanism 30 is identical to the upper section below the prime mover 34. That is, the lower section of the drive mechanism 30 generally includes a drive support 42 that rotatably mounts a pinion gear 50 and holds a rack 35 in engagement with the pinion gear 50, and can slide up and down vertically in the channel 32.

From the above it should be apparent that both drive mechanisms 28 and 30 receive power to move the slide-out room 12 relative to the rest of the vehicle 10. In some embodiments, the prime movers 34 of the drive mechanisms 28 and 30 may be synchronized to ensure that the slide-out room side walls 20 move in an appropriate manner relative to one another. The prime movers 34 may be synchronized as described in U.S. patent application Ser. No. 13/197,291, U.S. Pat. App. Pub. 2009/0261610, U.S. Pat. No. 6,536,823, U.S. Pat. No. 6,345,854, U.S. Pat. No. 6,471,275 or U.S. Pat. No. 6,696,813, the disclosures of which are hereby incorporated by reference. The prime movers 34 may alternatively be synchronized in other manners not described explicitly herein. For example, the prime movers 34 may be mechanically synchronized (via a shaft and gears, a chain and sprockets, or the like, connecting the two drive mechanisms 28 and 30).

Figure 44A:
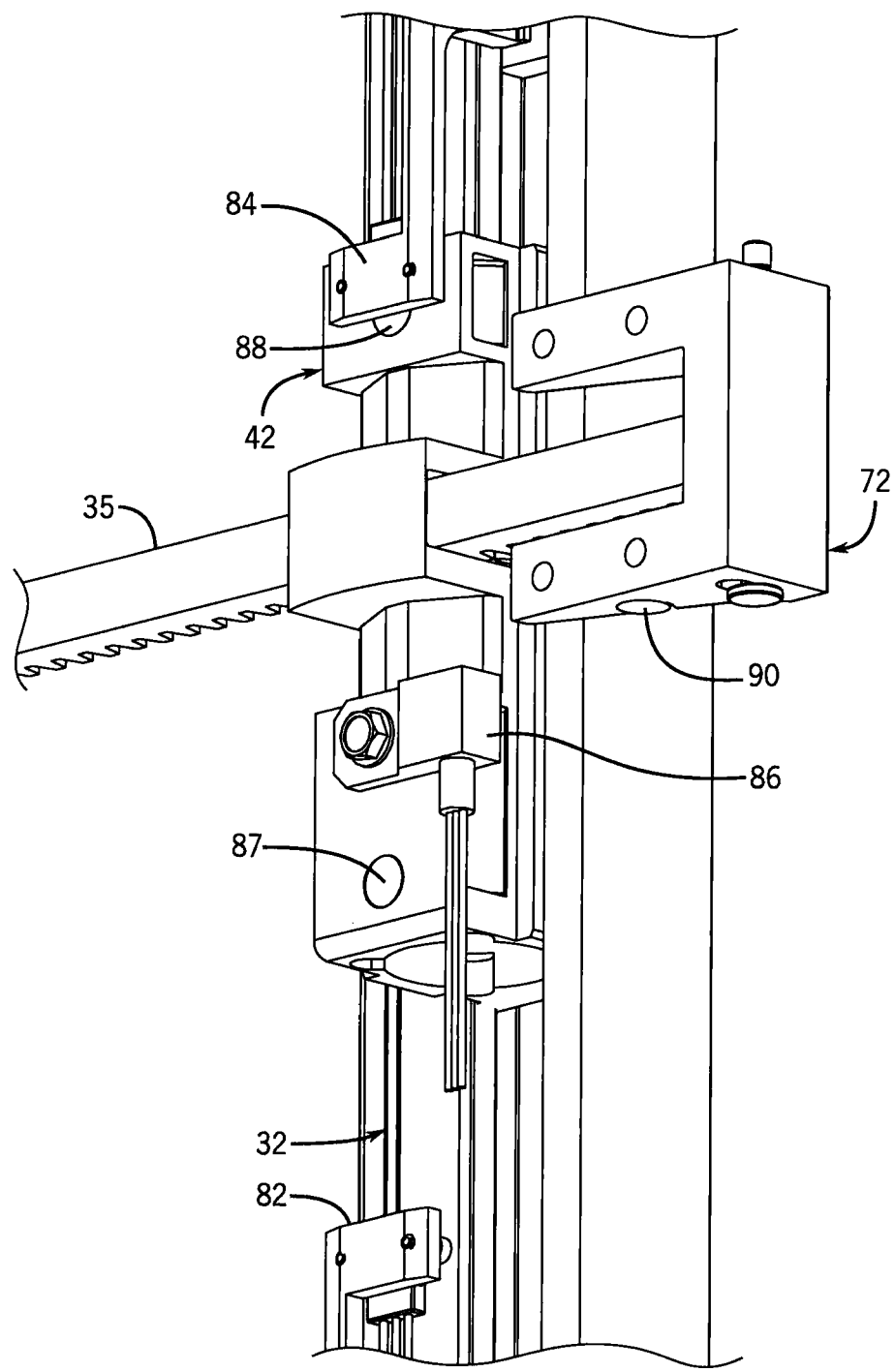
FIGS. 44A and 44B are perspective views showing position sensors on the operating mechanism.
Figure 44B:
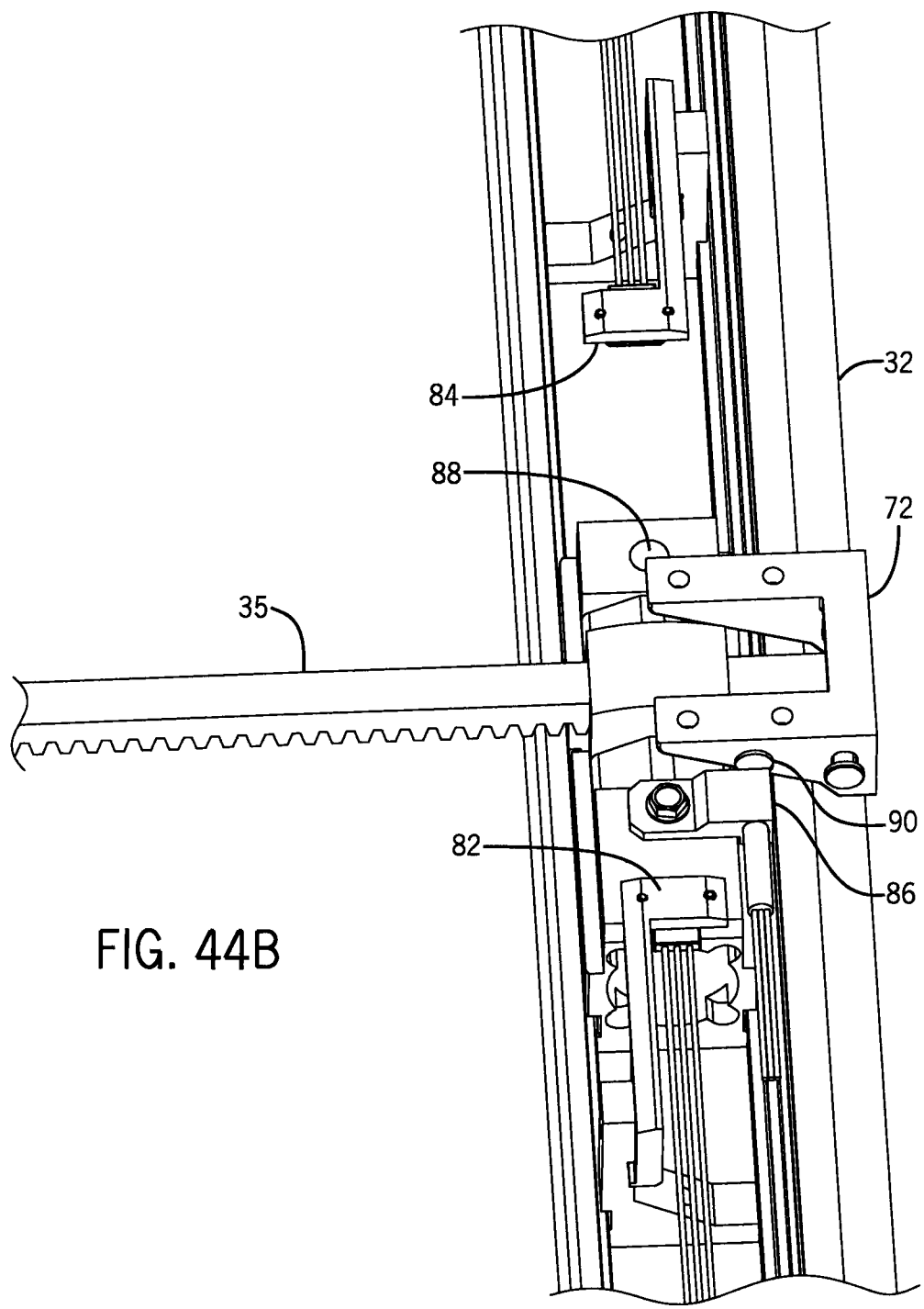

The drive mechanisms 28 and 30 may be operated by a single rocker switch (not shown) with one position for extending and one position for retracting. The switch is part of a control panel that is connected to a battery powered control unit that receives sensor and switch inputs and produces outputs to control the slide-out system motors, locks, etc., as is well known and described in the above mentioned patents. In addition, sensors as illustrated in FIGS. 44A and 44B may be mounted to the mechanisms 28 and 30 to provide inputs to the control unit. These sensors detect the horizontal and vertical position of the slide-out room so the control unit, in conjunction with its other inputs (e.g., the rocker switch input by the operator, the rotary encoder counts from the rotary encoders of the drive motors and the motor current values), can control the room extension and retraction in a desired sequence of movement. For example, in a square Z pattern of movement, more fully described below, from retraction the slide-out room 12 is extended to a first partially extended position, just short of compressing the room interior gaskets. In that position, the horizontal prime movers 34 are de-energized and a vertical prime mover (e.g., 346; see below) is energized to lower the room 12 to a lower position of the room. The sensors detect when the slide-out room 12 has attained the partially extended position to stop further horizontal movement and initiate lowering and then detect the lower position to stop lowering and re-initiate extension. Extension continues to compress the gaskets and then is stopped by sensing motor current, which increases as the gaskets are compressed.

Hall Effect or other sensors may be used for these sensors, with down sensor 82 and up sensor 84 mounted to the support channel 32 and extension sensor 86 mounted on the drive support 42. Magnet 86 actuates the down sensor 82 when the room is in the down position, magnet 88 actuates the up sensor 84 when the room is in the up position, and magnet 90 actuates the extension sensor when the room is at a partially extended position that is just short of compressing the interior gaskets, during both extension and retraction. That is the horizontal position at which the room is lowered during extension and is raised during retraction. The up sensor 84 remains actuated when the room is in the up position and the down sensor 82 remains actuated when the room is in the lower position, and the up sensor becomes de-actuated and remains so when the room is moved to the lower position and the down sensor 82 becomes de-actuated and remains so when the room is moved to the up position. Magnets 87 and 88 are mounted on the drive support and magnet 90 is mounted on the room engaging bracket 72. Other positions of the sensors are possible, either on the mechanism or on the room or stationary portion of the RV, and other types of sensors, such as mechanically operated limit switches or other sensors, may be used.

Figure 45:
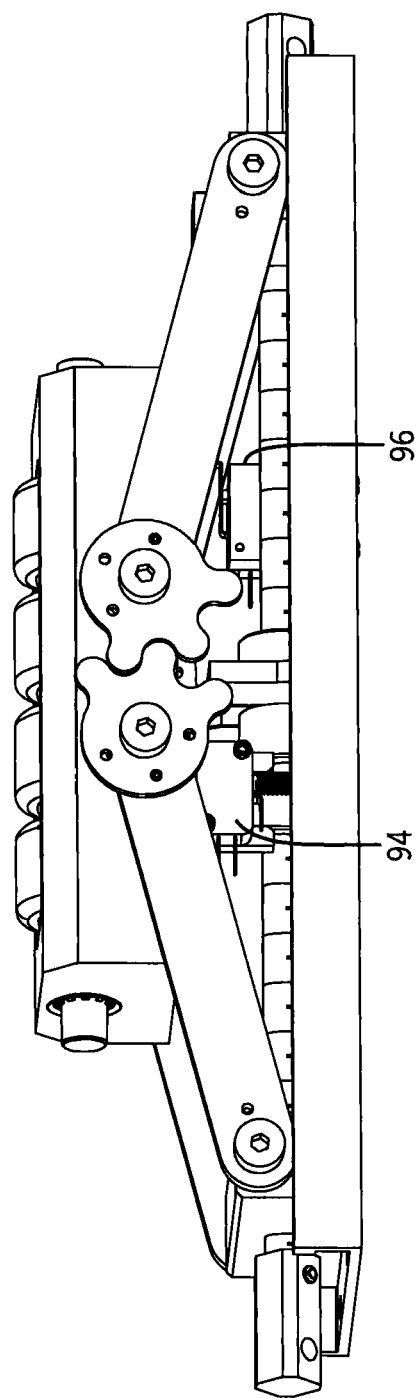
FIG. 45 is a perspective view illustrating a support mechanism (lift) having limit switch sensors and is illustrated in a lower position.
Figure 46:
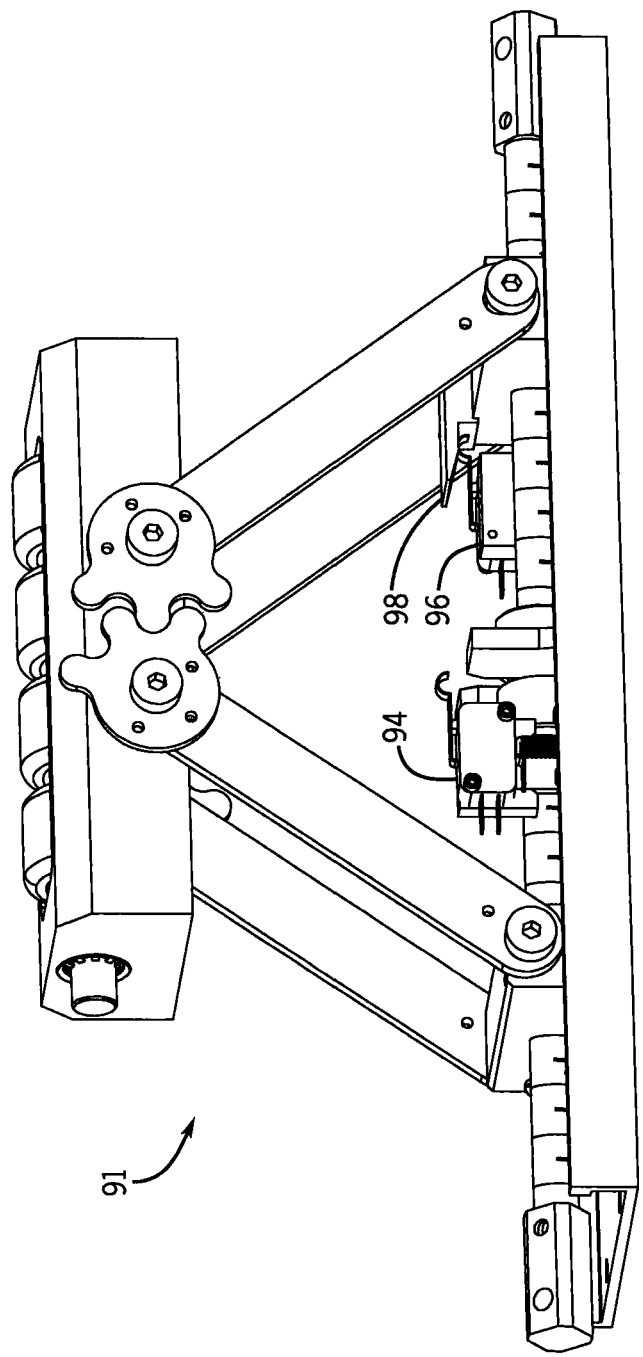
FIG. 46 is a perspective view like FIG. 45 but with the lift illustrated in an upper position.

In an alternate sensing configuration, electronic synchronization as discussed in the above referenced patents is used to detect extension and retraction of the room (by counting revolutions of the extension/retraction drive motor via a rotary encoder). In combination with that mode of determining horizontal position, elevation is detected with sensors in the room lift. For example, mechanically operated limit switches as illustrated in FIGS. 45 and 46 may be used to detect whether the room is up or down. FIG. 45 illustrates the down position with down limit switch 94 actuated and FIG. 46 illustrates the up position with up limit switch 96 actuated by cam actuator 98 that is mounted to one of the threaded support blocks. The lift 91 illustrated in FIGS. 45 and 46 is similar to the lift 702 of FIGS. 36 and 37, more fully described below, except for having a segmented roller and both sides of the drive shaft being threaded with one side reverse threaded so the threaded support blocks move together or apart in unison, when the common threaded shaft is turned, depending on which direction it is turned.

Figure 47:
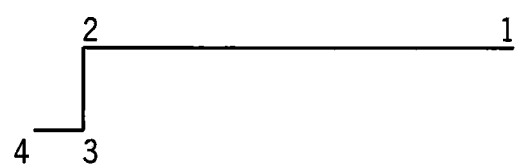
FIG. 47 is a schematic view of a pattern of movement of a slide-out room.

For the square Z movement described above, the fully retracted position is illustrated as position 1 in FIG. 47. In this position, the slide-out room is fully retracted and in the up position, and the up position sensor and the fully retracted position sensor (if provided) are actuated. A fully retracted sensor is not necessary, and neither is a fully extended sensor, since full retraction or extension can be detected positionally by the counts of the rotary encoder of the motor 36 or by detecting when the motor current rises to a certain level indicating compression of the gaskets, either at full extension or full retraction.

Still referring to FIG. 47, starting from the fully retracted position (position 1), when the extend button is pressed by a human operator, the motors 36 on both sides of the room are synchronously driven to extend the room evenly to the partially extended position 2 while the room is supported in the up position by one or more of the support mechanisms described below. Position 2 is not fully extended but is extended most of the way, just short of compressing the gaskets that seal the inside room flanges against the stationary RV walls. For example position 2 would typically be to within 0.25 to 1 inches of full extension, a distance so as not to compress the gaskets and leave a small clearance so the gasket does not rub on a wall when the room is raised or lowered. Preferably, an adjustment is provided to adjust this spacing (the distance from position 3 to position 4), either by a slide adjustment of the sensor 86 or magnet 90 (they could be mounted in slots to allow sliding them to change position), or if the counts of the rotary encoder are used to determine position 2, by adjusting the counts to horizontal position 2. In the case of using sensor 86 for horizontal positioning, rather than the counts of the rotary encoder, extension sensor 86 is actuated by magnet 90 at position 2 and at position 3. Whether a sensor or the counts are used, attaining position 2 stops horizontal extension and initiates lowering of the room by the lift(s), i.e., the drive motors 36 are stopped and the motor(s) that operate the lifts are operated to lower the room. Lowering continues until the fully down position, position 3, is reached, which will either be sensed by the sensor 82 being actuated by the magnet 87 in the embodiment of FIGS. 44A and B, or by the limit switch 94 in the lift embodiment of FIGS. 45 and 46. In either embodiment, obtaining position 3 stops the motor(s) that lower(s) the room and initiates further horizontal extension of the room until full extension is sensed either by obtaining the required number of counts from the motor 36 encoders or by sensing that the motor 36 current has exceeded a current indicating acceptable compression of the interior gaskets.

For retraction, the motion is reversed, so as to go 4-3-2-1 in FIG. 47. The mechanism stops at full retraction either by attaining the required number of counts from the motor 36 encoders or by sensing that the motor(s) 36 current(s) have exceeded a current indicating acceptable compression of the exterior gaskets. In reverse, when the operator presses the retract button, from full extension in the lower position, in which sensor 82 is actuated by magnet 87, retraction begins and magnet 90 actuates sensor 86 when position 3 is reached, which stops retraction and initiates elevation. When elevating the room, sensor 82 becomes de-actuated and when the upper position is reached, magnet 88 actuates sensor 84, which stops elevation and re-initiates retraction. At the onset of retraction when the room leaves position 2, sensor 86 becomes de-actuated while up position sensor 84 stays actuated and the retraction is continued at the upper position until position 1 is reached, in which position the exterior gaskets are fully compressed and the horizontal retraction motion is stopped, either by obtaining the required number of counts by the rotary encoders of the motors 36 or by sensing that the current drawn by the motors has exceeded a current value indicating adequate compression of the gaskets.

Figure 48:
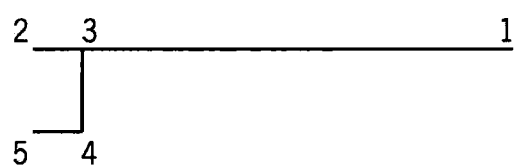
FIG. 48 is an alternative schematic view of a pattern of movement of a slide-out room.

An alternative sequence for extending is illustrated in FIG. 48, which can use the same sensor configuration as described above. In this sequence, upon extension of the room from full retraction (position 1), the room is first fully extended to full compression of the interior gaskets (position 2), stopped and is then retracted enough to decompress the gaskets, which is at partially extended position 3, which corresponds to position 2 in the embodiment of FIG. 47. This results in a more precise placement of the room near the end of its extension but without compressing the gaskets. Preferably, the distance the room is retracted in FIG. 48 from position 2 to position 3 is adjustable as described above, and would typically be about 0.25 to 1 inches. At position 3, the room is lowered to position 4 and then the room is fully extended in the lowered position to the fully extended and lowered position 5 in which the gaskets are fully compressed. This produces a path of movement in a square h pattern.

For retraction, the movement would be 5-4-3-1 for the pattern of FIG. 48. During retraction, there is no need to go from position 3 to position 2 and back so those steps are skipped, so retraction is a reverse square Z pattern.

It is noted that if acceptable gaskets were provided that could withstand shear or could be actuated after the final lowered extended position was attained, or otherwise permit vertical movement of the room in the fully extended position, the distance from position 2 to position 3 in FIG. 48 could be adjusted to zero, or the distance from 3 to 4 in the pattern of FIG. 47 could be adjusted to zero. In such a case, the shape of the motion from retraction to full extension would be L shaped, with the room being driven to full extension and then lowered and stopped.

As described above, any of the disclosed methods of sensing may be used for these patterns, or other methods, e.g., Hall Effect sensors for horizontal and/or vertical position sensing, motor 36 rotary encoder counts for horizontal position sensing, lift motor rotary encoder counts for vertical position sensing (rotary encoders could also be provided on the lift motors), mechanical limit switches for horizontal or vertical position sensing, or a combination of motor rotary encoder counts for horizontal position sensing and mechanical limit switches at the lifts, drive mechanism or room structure for vertical position sensing, or other sensing configurations.

The drive mechanisms 28 and 30 may also be controlled in an "automatic jog mode". That is, if the sensors detect no movement of one of the drive mechanisms 28 or 30 in one direction, the other mechanism 28 or 30 will also be de-energized. Subsequently, movement of the mechanisms 28 and 30 in the same direction is not allowed, and movement of the mechanisms 28 and 30 in the opposite direction is the only direction permitted. If the sensors detect no movement of the same drive mechanism 28 or 30 in the opposite direction, the other mechanism 28 or 30 will be de-energized and the system is put into an emergency retract mode or "automatic jog mode". In this mode, the system only permits a short time of movement in the direction of a button push. Instead, multiple button pushes are needed to fully retract or extend the room 12.

Figure 10:
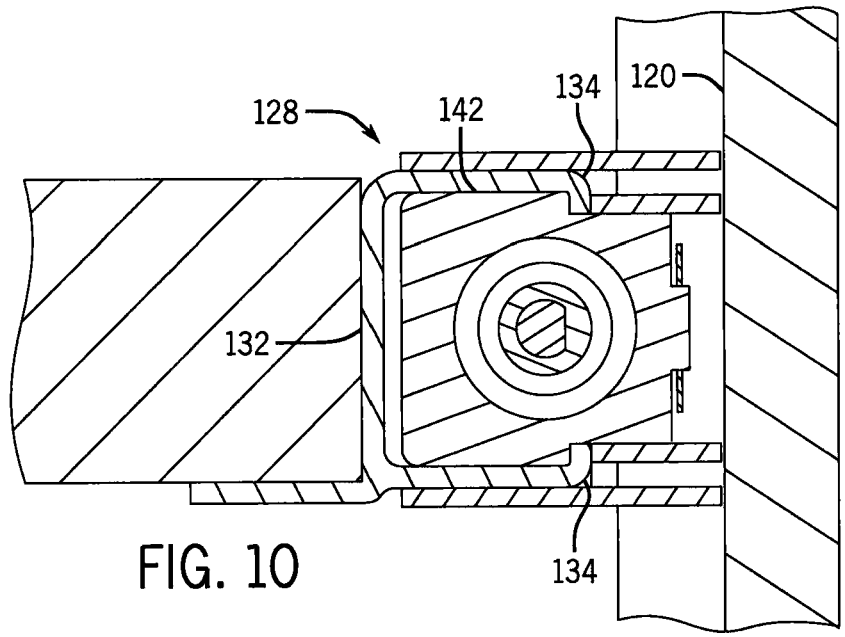
FIG. 10 is a top sectional view of a second embodiment of the drive mechanism illustrating an interface between a support channel and a drive support.

Turning now to FIG. 10, a second embodiment of the drive mechanism 130 is generally as described above. However, the support channel 132 includes one or more lips 134 that connect to an edge proximate the slide-out room side wall 120 and extend in the drive direction. The lips 134 also extend between the drive support 142 and the slide-out room side wall 120, or "wrap" around the drive support 142, to inhibit the drive support 142 from moving out of the channel 132 in the transverse direction. However, the lips 134 permit the drive support 142 to float in the elevation direction as described above.

Figure 11:
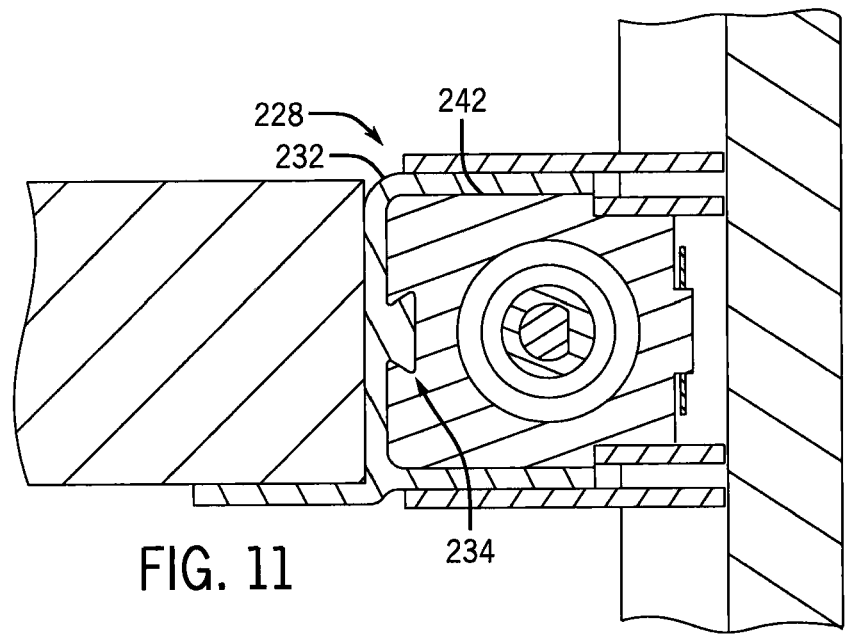
FIG. 11 is a top sectional view of a third embodiment of the drive mechanism illustrating an interface between the support channel and the drive support.
Figure 14:
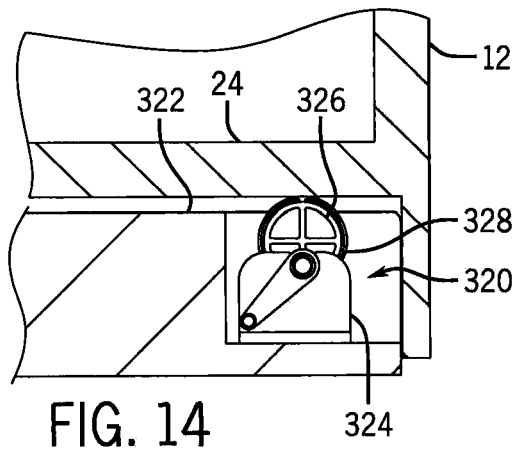
FIG. 14 is a section view of the slide-out room in the retracted position.

Referring to FIG. 11, a third embodiment of the drive mechanism 230 is also generally as described above. However, the support channel 232 and the drive support 242 include an interface 234 proximate the rear wall of the channel 232 to connect the two components. As shown in the figures, the interface 234 may have a dovetail shape. Other shapes may be used provided that they inhibit the drive support 242 from moving out of the channel 232 in the transverse direction and permit the drive support 242 to float in the elevation direction.

Referring to FIGS. 12-18 and as briefly described above, in some embodiments the ability of the drive supports 42 to float in the elevation direction permits the slide-out room 12 to be used as a flush floor room. As the name implies, the floor of such a flush floor room moves downwardly and is level with the floor of the vehicle in the extended position (see FIG. 18). To facilitate such downward movement of the slide-out room 12, the vehicle 10 mounts one or more roller or support mechanisms 320 between its floor 322 and the floor 24 of the slide-out room 12.

Generally, the support mechanism 320 includes a roller support bracket 324 that eccentrically and rotatably mounts an inner roller 326. The inner roller 326 concentrically and rotatably mounts an outer roller 328 that engages the floor 24 of the slide-out room 12.

As shown most clearly in FIGS. 12 and 13, the roller support bracket 324 is a generally U-shaped component as viewed in the drive direction and may be a stamped and bent piece of metal or the like. The roller support bracket 324 includes a base 330 that engages the vehicle floor 322, and two edges of the base 330 connect to upwardly extending side walls 332. Each side wall 332 includes a notch 334 (FIG. 13) for receiving the inner roller 326, and each side wall 332 connects to a support link 336 that holds the inner roller 326 in the notches 334.

The inner roller 326 is a generally cylindrical component and may be a molded plastic or the like. The inner roller 326 also includes internal walls 338 to connect to the roller support bracket 324. In particular, the walls 338 engage an axle 340 that is supported by the support links 336. The axle 340 extends eccentrically through the inner roller 326, and the axle 340 rotatably fixedly connects to the inner roller 326 via a non-circular cross-sectional shaped portion 342 (for example, a hexagonal cross-sectional shape as shown in FIG. 13) that is received in a non-circular cross-sectional shaped passageway 344 defined by the internal walls 338. As such, a prime mover 346 (for example, an electric motor or the like as shown in FIG. 12) may drive the axle 340 and eccentrically rotate the inner roller 326.

The outer roller 328 is a generally cylindrical component and may be a molded plastic or the like. The outer roller 328 concentrically and rotatably mounts over the inner roller 326. The inner roller 326 may also support snap rings 348 on the sides of the outer roller 328 to inhibit the outer roller 328 from moving axially relative to the inner roller 326.

Figure 15:
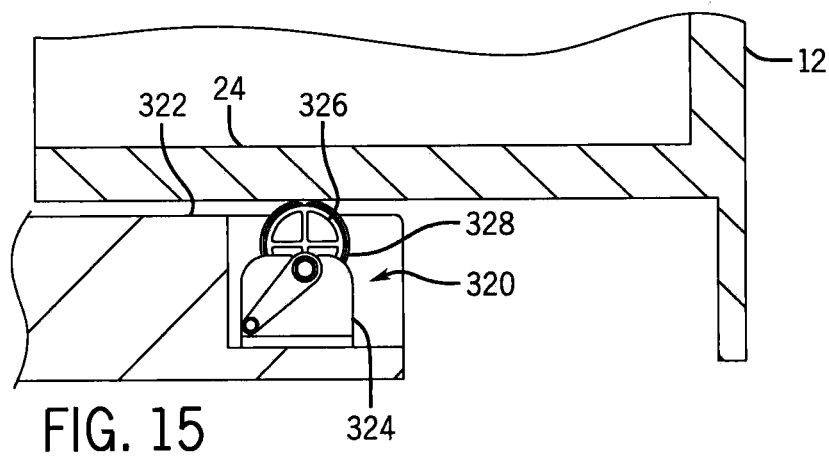
FIG. 15 is a section view of the slide-out room moving toward the extended position.
Figure 16:
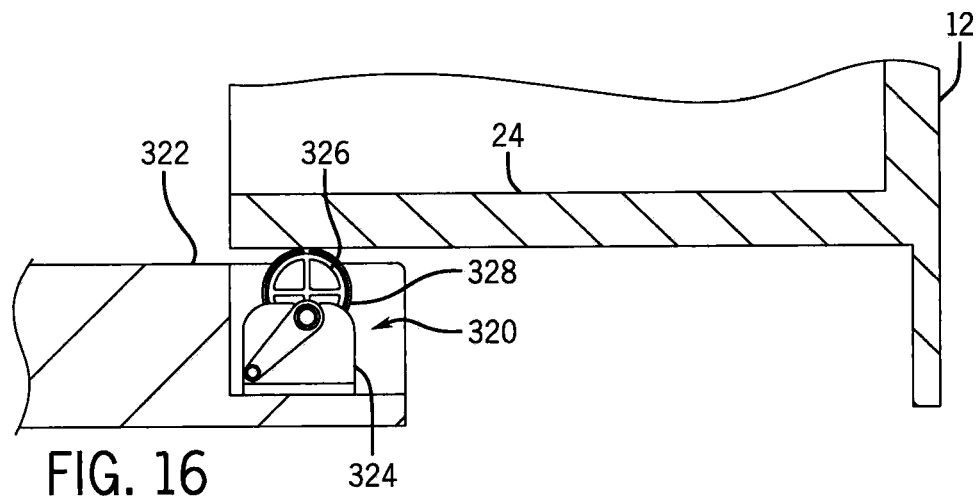
FIG. 16 is another section view of the slide-out room moving toward the extended position.
Figure 17:
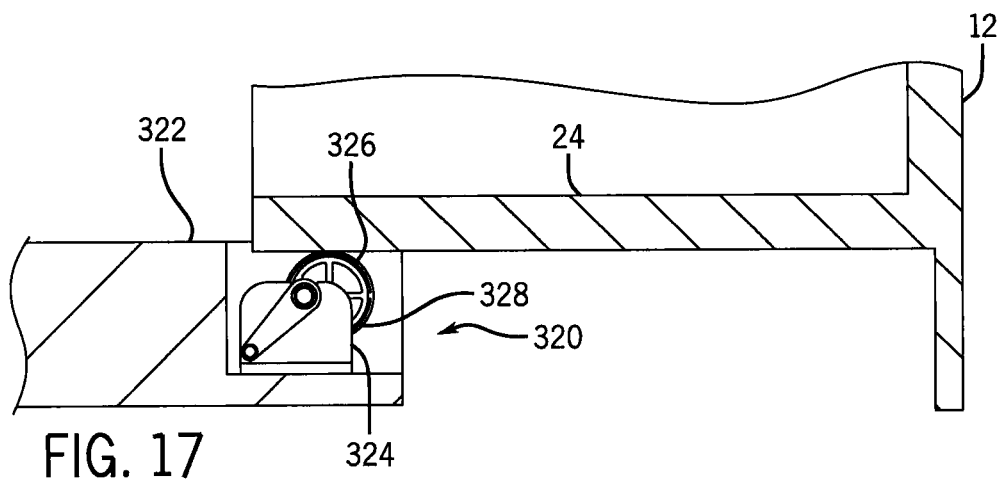
FIG. 17 is another section view of the slide-out room moving toward the extended position and the roller mechanism lowering the slide-out room in the elevation direction.
Figure 18:
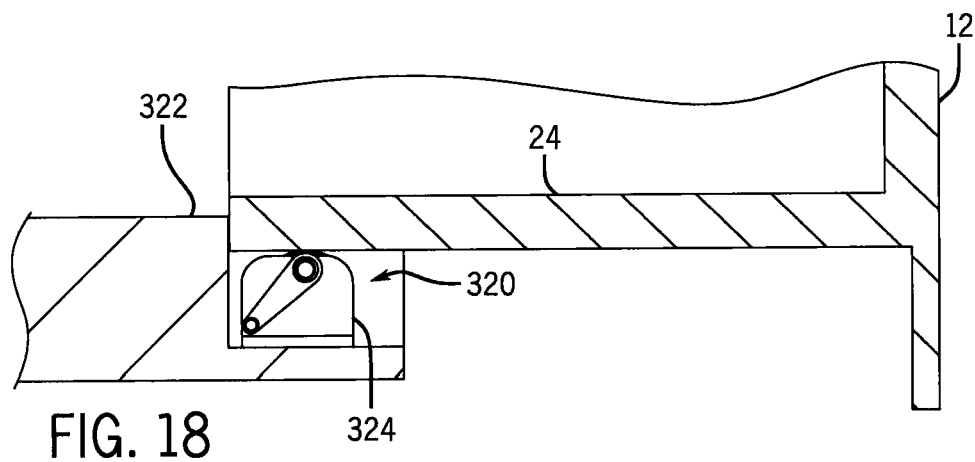
FIG. 18 is a section view of the slide-out room in the extended position with the slide-out room lowered in the elevation direction to provide a "flush floor" configuration.

Together, the inner roller 326 and the outer roller 328 lower the slide-out room 12 in the elevation direction as follows. The inner roller 326 and the outer roller 328 are first disposed in the position shown in FIG. 14 when the slide-out room 12 is in the retracted position; that is, the inner and outer rollers 326 and 328 hold the slide-out floor 24 above the vehicle floor 322. As the slide-out room 12 begins to move toward the extended position as shown in FIG. 15, the outer roller 328 rotates as the slide-out floor 24 moves thereover and the inner roller 326 remains stationary. When the slide-out room 12 is nearly fully extended as shown in FIG. 16, the prime mover 346 is energized to eccentrically rotate the inner roller 326 in a clockwise direction as shown in FIG. 17. This action lowers the slide-out room 12 relative to the vehicle floor 322, and the prime mover 346 is de-energized to stop the inner roller 326 when the slide-out floor 24 is flush with the vehicle floor 322 as shown in FIG. 18.

The support mechanism 320 and the slide-out room 12 generally move in the opposite manner to raise the slide-out room 12 as the room 12 moves from the extended position to the retracted position.

Figure 19:
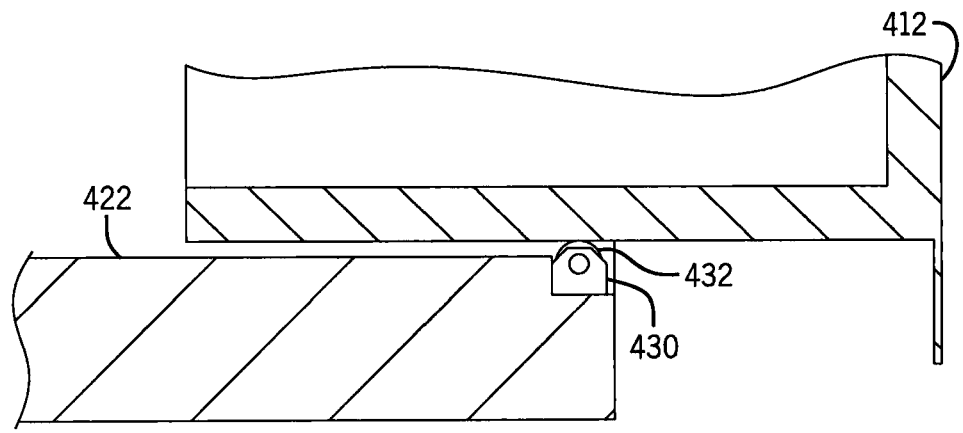
FIG. 19 is a section view of a slide-out room including a non-flush floor roller.

Referring to FIG. 19, in the embodiments described above the slide-out room need not act as a flush floor room. That is, the floor 422 of the vehicle may fixedly mount brackets 430 (only a single bracket is shown) that each rotatably support a roller 432. The rollers 432 simply permit the slide-out room 412 to move in a generally horizontal direction when moving from the retracted position to the extended position and vice versa. In addition, the rollers 432 support the weight of the slide-out room 12.

Figure 21:
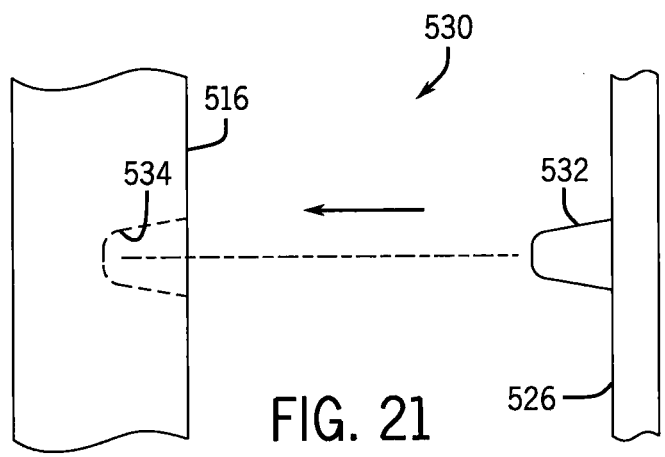
FIG. 21 is a detail side view of the slide-out room in the extended position with the float inhibiting mechanisms disengaged.
Figure 22:
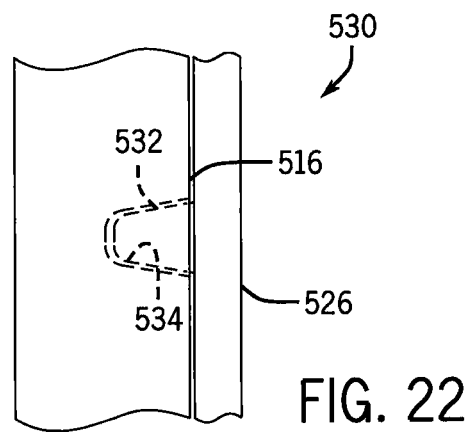
FIG. 22 is a detail side view of the slide-out room in the retracted position with the float inhibiting mechanisms engaged.
Figure 20:
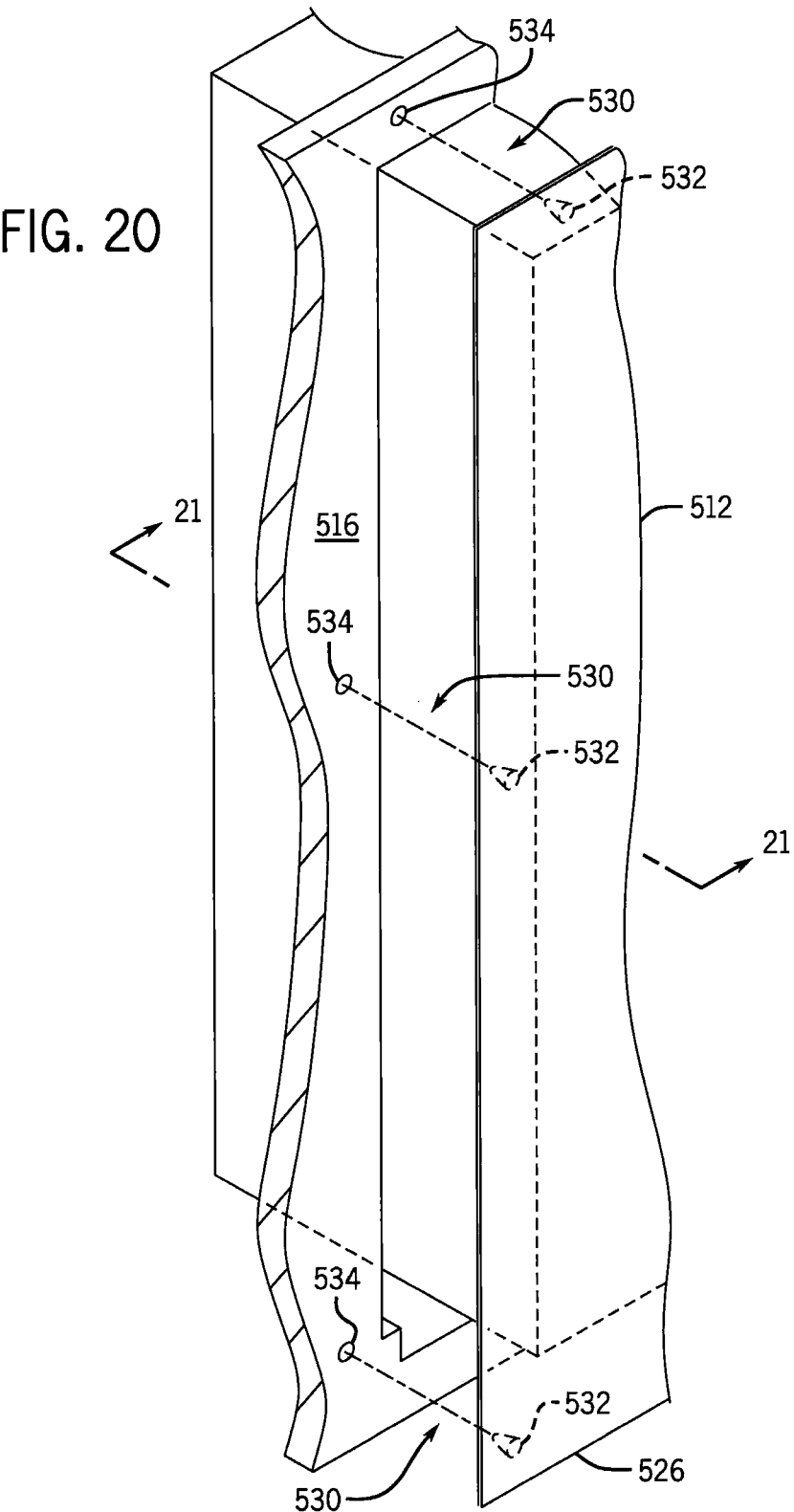
FIG. 20 is a perspective view of the slide-out room system including float inhibiting mechanisms.
Figure 23:
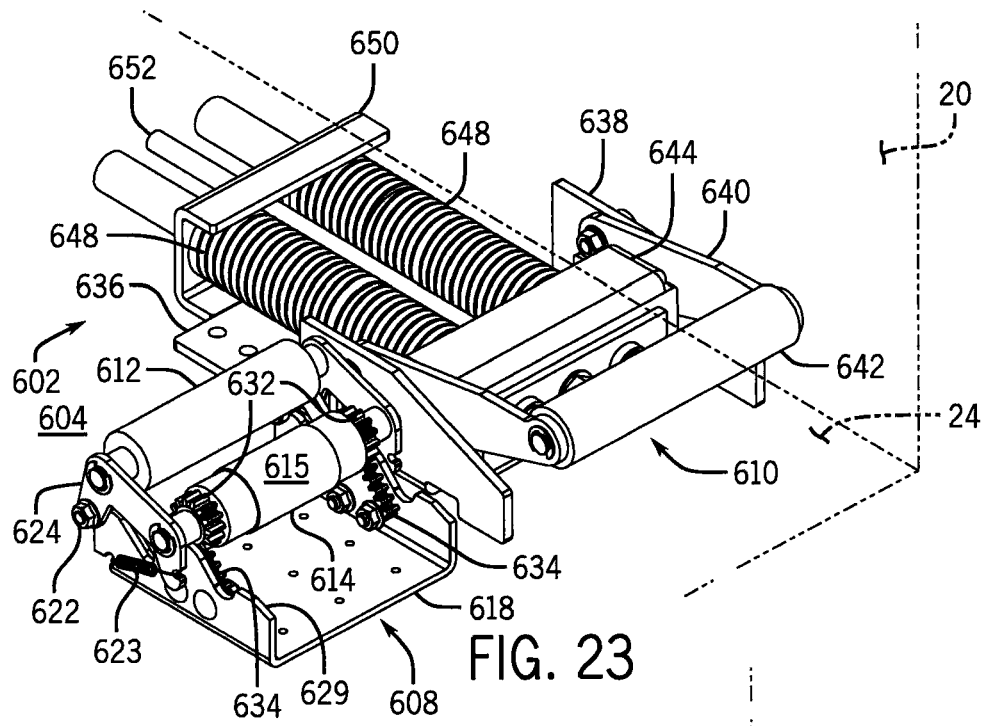
FIG. 23 is a perspective view of another embodiment of a support mechanism supporting the slide-out room of FIG. 1.
Figure 24:
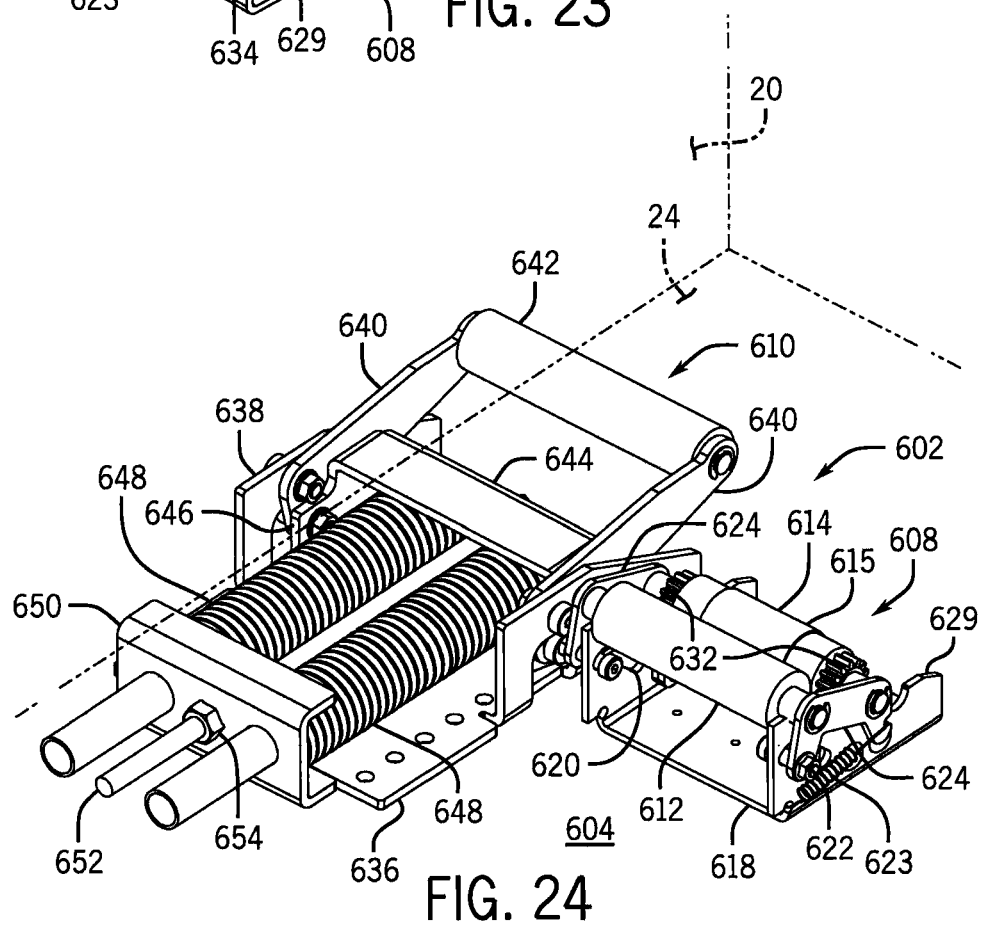
FIG. 24 is another perspective view of the support mechanism of FIG. 23.

Referring to FIGS. 20-22, any of the above embodiments may further include one or more float inhibiting mechanisms 530 that, as the name implies, inhibit the slide-out room 512 from floating in the transverse direction as the vehicle moves. In the embodiments shown in the figures, the float inhibiting mechanisms 530 each include a frusto-conical shaped post 532 supported by the fascia 526 and facing the side wall 516 of the vehicle. Each post 532 may comprise a resilient material, such as rubber or the like. In the retracted position (FIG. 22), each post 532 is received in a corresponding frusto-conical shaped blind hole 534 defined by the vehicle side wall 516. As such, engagement between the posts 532 and the side wall 516 within the holes 534 inhibits the slide-out room 512 from floating in the transverse direction (i.e., the direction of vehicle movement over the road) as the vehicle moves.

The float inhibiting mechanisms 530 may take other forms and shapes provided that some portion of the mechanism 530 engages or nearly engages the side wall 516 in the retracted position. Alternatively, a positive feature (for example, a post) may be supported by the side wall 516 and a corresponding feature (for example, a hole) may be defined by the fascia 526.

Referring to FIGS. 23-35, another embodiment of a flush floor support mechanism 602 is shown (the vehicle 10 mounts two mechanisms 602, although only one of which is shown). The support mechanisms 602 are disposed between the floor 604 of the vehicle 10 and the floor 24 of the slide-out room 12. The support mechanisms 602 are generally identical except for being disposed in mirrored relation to one another. As such, only one support mechanism 602 will be described below for simplicity.

Generally, the support mechanism 602 includes an elevation assembly 608 that facilitates raising and lowering the slide-out room 12. The support mechanism 602 also includes a biasing assembly 610 that further facilitates raising and lowering the slide-out room 12 and advantageously assists in raising the room 12 when moving from the extended position to the retracted position.

Turning first to the elevation assembly 608 and FIGS. 23-26, this assembly includes a support bracket 618 that is generally U-shaped as viewed in the drive direction, such as a stamped and bent metal bracket. The support bracket 618 also defines guide paths 620 (e.g., j-shaped slots, FIG. 26) that each movably receive a guide pin 622 of a roller linkage 624. This structure ensures the roller linkage 624 maintains its connection to the support bracket 618.

The roller linkage 624 is a generally flat and upside-down U-shaped component, such as a stamped piece of metal. One of the legs mounts the guide pin 622, the intersection between two of the legs pivotally mounts a first elevation roller 612 that engages the slide-out floor. 24, and the other intersection between two of the legs pivotally mounts a non-slip second elevation roller 614 that engages the slide-out floor 24. As such, the guide pin 622, the first elevation roller 612, and the second elevation roller 614 remain spaced apart from each other by constant distances as the roller linkage 624 translates relative to the support bracket 618. The leg opposite the guide pin 622 connects to one end of an extension spring 623, and the opposite end of the spring 623 connects to the support bracket 618. As such, the extension spring 623 biases the linkage 624 and the rollers 612 and 614 toward the configuration shown in full lines in FIG. 26.

Figures 25, 26:
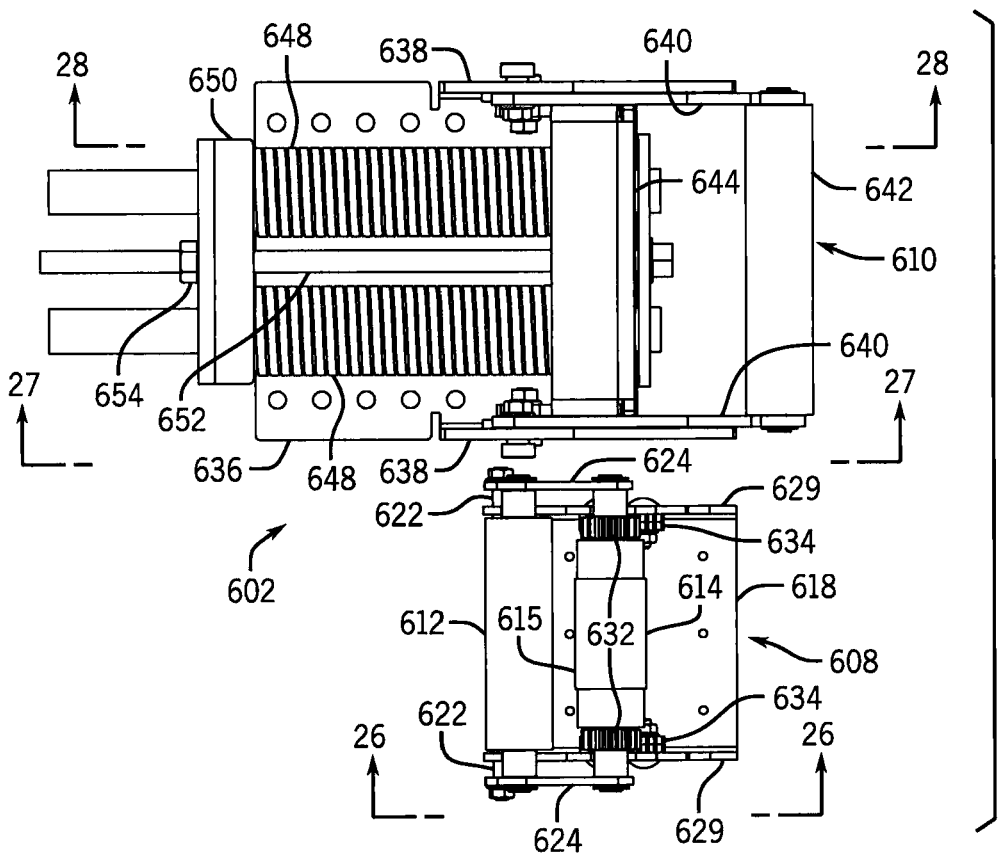
FIG. 25 is a top view of the support mechanism of FIG. 23.
FIG. 26 is a side view of an elevation assembly of the support mechanism along line 26-26 of FIG. 25 in the slide-out room's retracted position; the elevation assembly is shown in phantom in the slide-out room's extended position.
Figure 29:
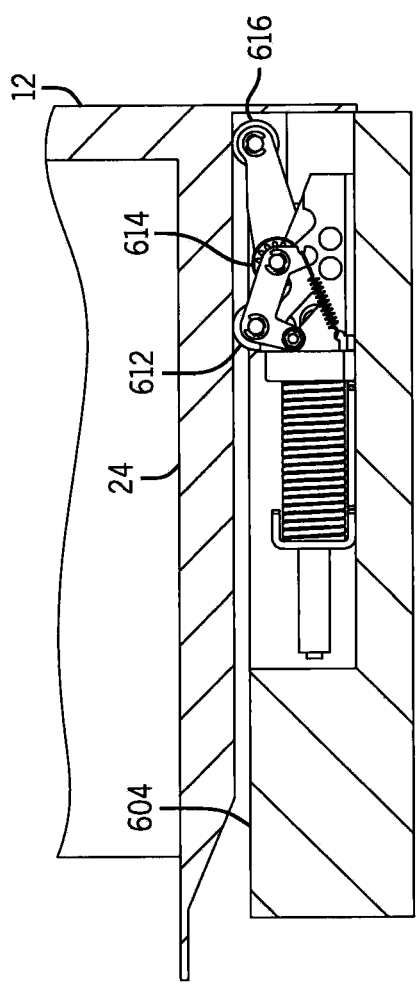
FIG. 29 is a section view of the slide-out room in the retracted position.

As shown in FIG. 26, the roller linkage 624 moves between the position shown in full lines in the slide-out room's retracted position and the position shown in phantom lines in the slide-out room's extended position. In the retracted position, the pins mounting the rollers 612 and 614 are supported at stable locations 626 and 628, respectively, defined by the walls 629 of the support bracket 618. As such, and also due to the shape of the guide paths 620, the rollers 612 and 614 do not move downwardly under the weight of the slide-out room 12 in the retracted position. Similarly, in the extended position, the roller pins are supported at stable locations 630 and 631, respectively, defined by the walls 629 of the support bracket 618. As such, the rollers 612 and 614 do not move downwardly under the weight of the slide-out room 12 in the extended position.

Movement of the roller linkage 624 and the rollers 612 and 614 is guided a guide assembly of the elevation assembly 608. Pinions 632 of this assembly are fixedly mounted to the second elevation roller 614. As such, as the second elevation roller 614 rotates, the pinions 632 rotate and translate along guide members or racks 634 supported by the support bracket 618 and extending at an acute angle to the drive direction. The interaction of these components and the motion of the roller linkage 624, the rollers 612 and 614, and the pinions 632 will be described in further detail below.

To ensure the second roller 614 rotates and translates along the gear rack 634 as the slide-out room 12 engages and moves thereover (i.e., to prevent the slide-out room 12 from slipping on the second roller 614), the second roller 614 may be a non-slip or relatively high friction component. To this end, the second roller 614 may include a relatively high friction cover 615 (e.g., a rubber or sandpaper-like cover). In other embodiments, the lower surface of the floor 24 may support a relatively high friction outer layer.

Turning now to the biasing assembly 610 and FIGS. 23-25, 27, and 28, this assembly includes a support bracket 636 that is generally U-shaped as viewed from the side, such as a stamped and bent metal bracket. However, the support bracket 636 also includes side walls 638 that pivotally support several components. In particular, each side wall 638 pivotally supports a roller bracket 640, which are flat and elongated components, such as stamped pieces of metal. Opposite their pivotal connection to the side walls 638, the roller brackets 640 together rotatably mount a floor-engaging biasing roller 642.

The roller brackets 640 also pivotally support a biasing bracket 644 connected therebetween. The biasing bracket 644 is generally right angle-shaped as viewed from the side except for side walls 646 (FIG. 24) that connect to the roller brackets 640. As such, the biasing bracket 644 may be a stamped and bent metal bracket.

The biasing bracket 644 engages ends of compression springs 648. The other ends of the compression springs 648 engage a rear wall 650 of the support bracket 636. As such, the compression springs 648 are compressed between the rear wall 650 and the biasing bracket 644. This urges the biasing bracket 644 outwardly in the travel direction, which in turn urges the biasing roller 642 generally upwardly in the elevation direction. As described in further detail below, the biasing roller 642 thereby biases the slide-out room 12 upwardly in the elevation direction.

The biasing assembly 610 further includes a threaded screw 652 extending between the support bracket 636 and the biasing bracket 644. A threaded nut 654 connects to the threaded screw 652 on the outside of the rear wall 650 to limit the maximum distance between the rear wall 650 and the biasing bracket 644. This essentially provides a "stop" that defines the position to which the roller brackets 640 and the biasing roller 642 are biased.

Figure 30:
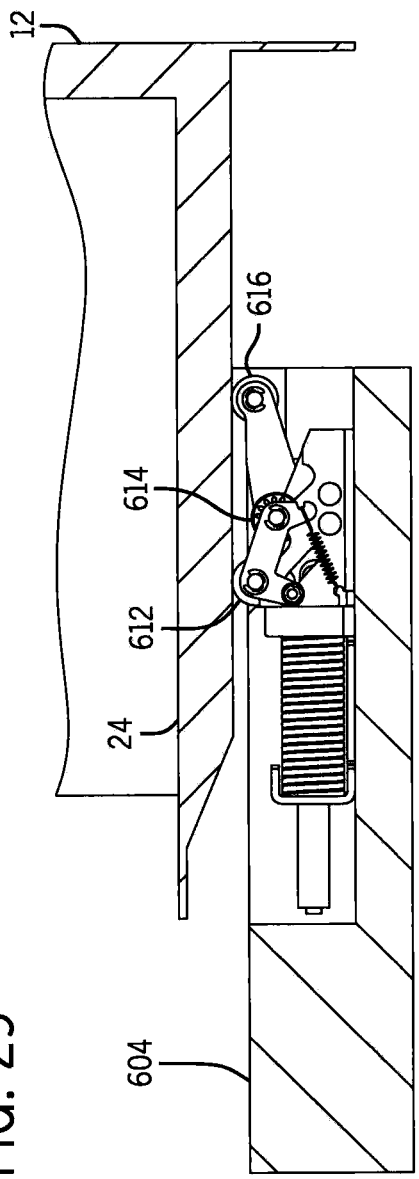
FIG. 30 is a section view of the slide-out room moving toward the extended position.

The support mechanism 602 generally causes the room 12 to descend when moving to the extended position as follows. The first elevation roller 612, the second elevation roller 614, and the biasing roller 616 are disposed in the positions shown in FIGS. 26-27 when the slide-out room 12 is in the retracted position (FIG. 29) and over most of the range of motion apart from the extended position (FIG. 30). That is, the first elevation roller 612 and the biasing roller 616 support the room 12 and the second elevation roller 614 does not. When the slide-out room 12 approaches the extended position (FIG. 31), the first elevation roller 612 engages an inclined lower surface 656 of the slide-out room 12 that is disposed at an acute angle to the drive direction. As the first elevation roller 612 continues to rotate and pass over the inclined lower surface 656, the slide-out room 12 begins to descend. The slide-out room 12 descends instead of tipping backwards because the pinions 50 and 94 are driven at the same speed, and therefore the ceiling 22 and the floor 24 of the slide-out room 12 are driven at the same speed. Furthermore, the biasing roller 616 descends as the room 12 descends, and the compression springs 648 are thereby loaded.

Figure 35:
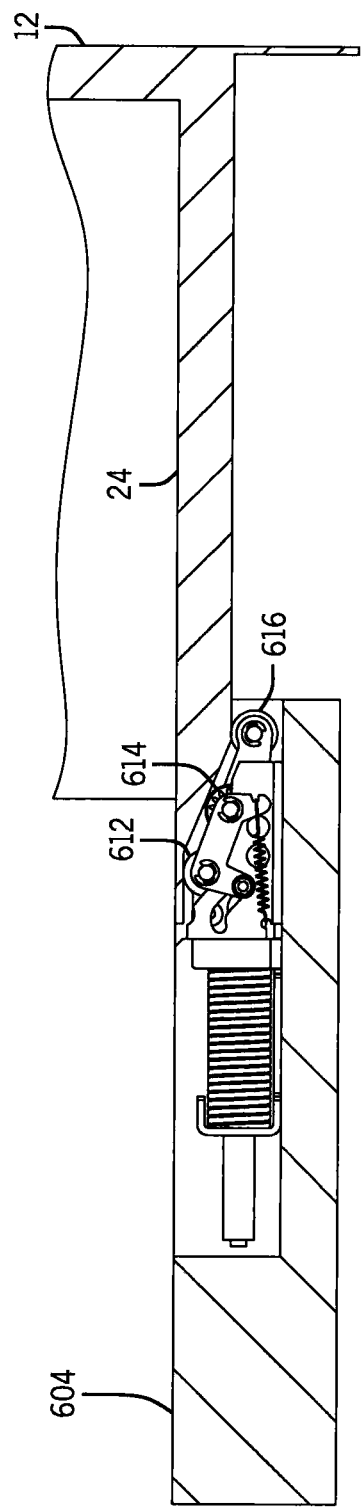
FIG. 35 is a section view of the slide-out room in the extended position.

Eventually the slide-out room 12 descends a sufficient distance such that the floor 24 engages the second elevation roller 614 (FIG. 32). As the room 12 continues to extend and rotates the second elevation roller 614, the pinions 632 rotate and traverse along the racks 634 (FIG. 33). The second elevation roller 614 moves together with the pinions 632, and the first elevation roller 614 follows the second elevation roller 614 due to their connection to the roller linkage 624. The first elevation roller 612 then engages a horizontal surface 658 adjacent the inclined surface 656 (FIG. 34), and the slide-out room 12 stops descending. Finally, the slide-out room 12 moves horizontally to disengage the second elevation roller 614 from the floor 24 and reach the extended position (FIG. 35).

To return the slide-out room 12 to the retracted position, the room 12 and the support mechanism 602 generally move in the opposite manner. However, it should be apparent that the springs 648 are more compressed in the extended position than the retracted position, and the springs 648 thereby urge the biasing roller 616 upwardly to provide an assist for lifting the slide-out room 12. As such, the prime movers 34 advantageously do not need to be capable of providing sufficient power to lift the slide-out room 12 on their own.

Referring to FIGS. 36-39, another embodiment of a flush floor support mechanism 702 is shown (the vehicle 10 mounts two mechanisms 702, although only one of which is shown). The support mechanisms 702 are disposed between the floor of the vehicle and the floor of the slide-out room. The support mechanisms 702 are generally identical except for possibly being disposed in mirrored relation to one another. As such, only one support mechanism 702 will be described below for simplicity.

The support mechanism 702 includes a roller 704 that is moved in the elevation direction to move the slide-out room in the elevation direction. The roller 704 is moved via an elevating mechanism that includes a prime mover (not shown), such as a DC motor connected to a speed-reducing gearbox. The prime mover drives a threaded shaft 706 that in turn translatably drives a first support block 708 along a base 710 (see FIGS. 36 and 38).

The first support block 708 pivotally mounts first links 712 that pivotally connect to a roller mounting bracket 714 opposite the first support block 708. Adjacent the first links 712, the roller mounting bracket 714 also pivotally connects to second links 716. The second links 716 also connect to a second support block 718 translatably mounted to the base 710. As shown in the figures, the threaded shaft 706 may extend through the second support block 718, although the shaft 706 does not directly drive the second support block 718.

Figure 36:
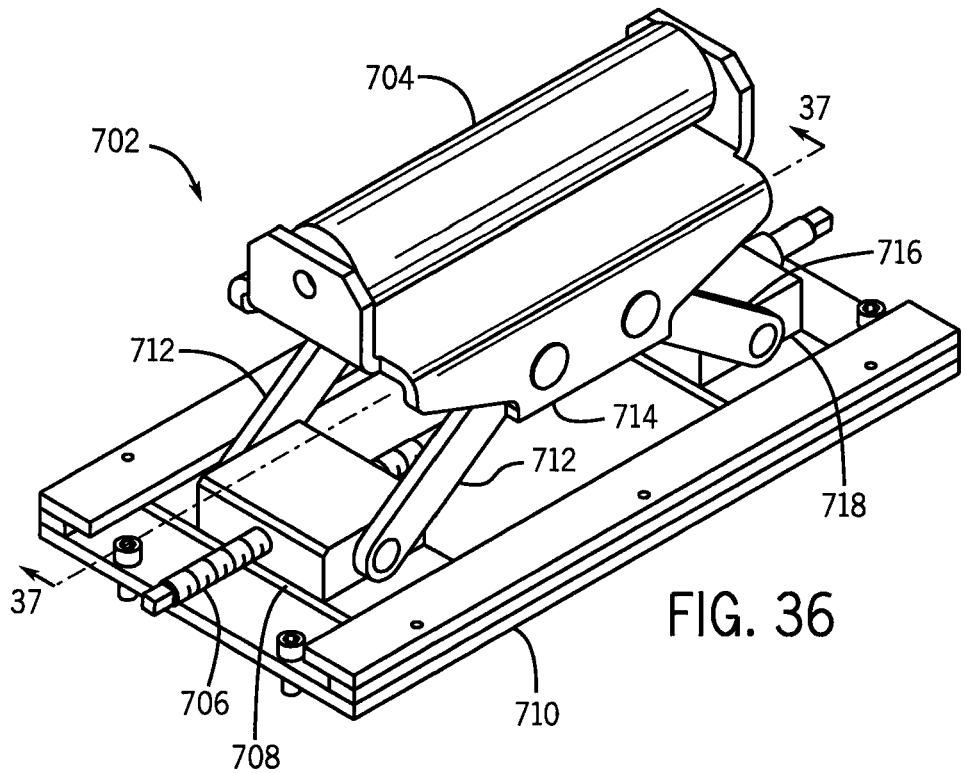
FIG. 36 is a perspective view of another embodiment of a support mechanism supporting the slide-out room of FIG. 1 in an elevated position.
Figure 37:
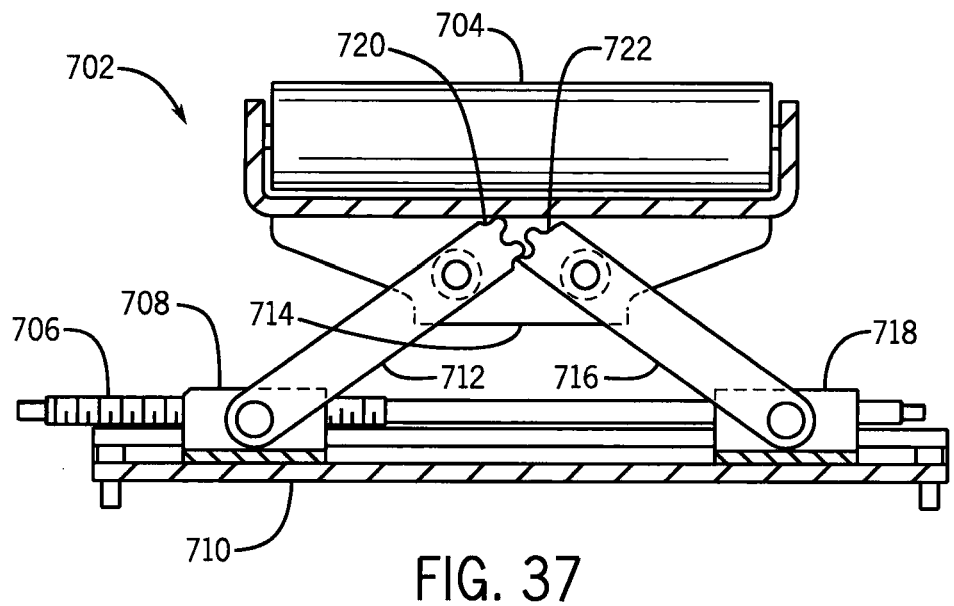
FIG. 37 is a side view of the support mechanism along line 37-37 of FIG. 36.
Figure 38:
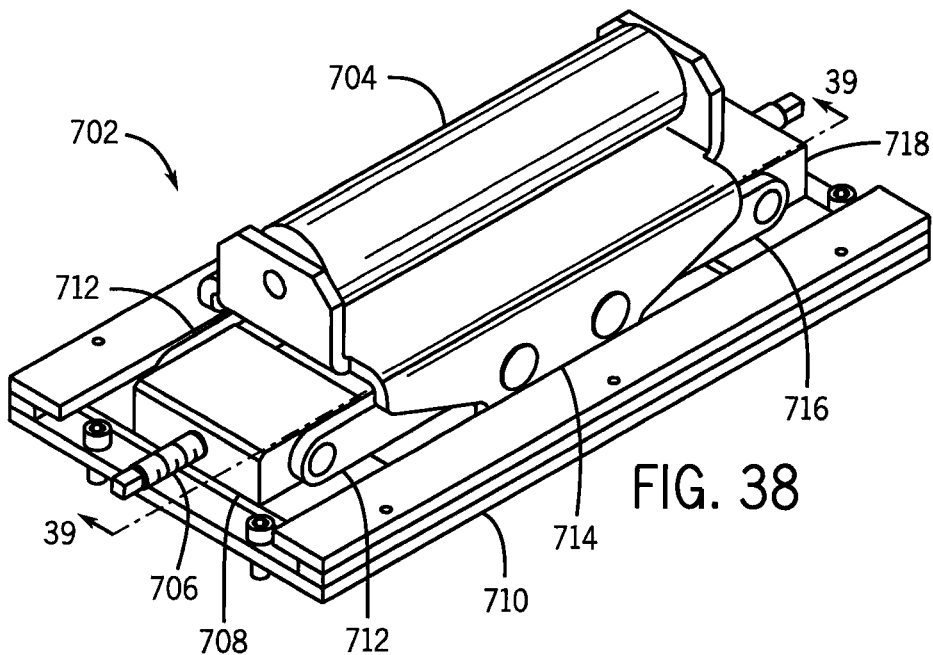
FIG. 38 is a perspective view of the support mechanism of FIG. 36 in a lowered position.
Figure 39:
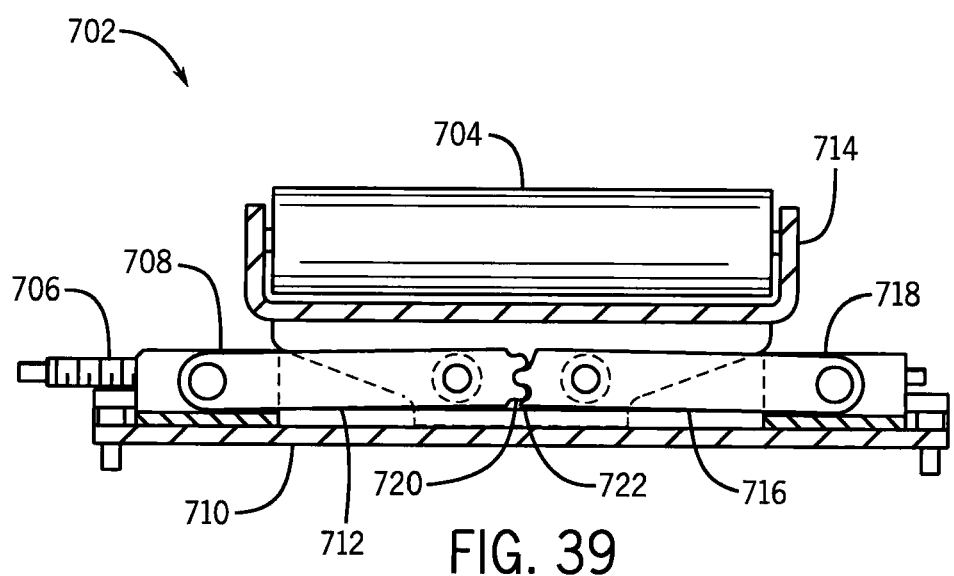
FIG. 39 is a side view of the support mechanism along line 39-39 of FIG. 38.

The ends of the first links 712 proximate the roller mounting bracket 714 include first gear tooth surfaces 720 (FIGS. 37 and 39). These surfaces 720 drivingly engage second gear tooth surfaces 722 at the ends of the second links 716 proximate the roller mounting bracket 714. Thus, engagement of the gear tooth surfaces 720, 722 cause the links 712, 716 to pivot and the support blocks 708, 718 to translate in coordinated manners. That is and as shown in FIGS. 38 and 39, as the threaded shaft 706 rotates in one direction, the support blocks 708, 718 move apart and the links 712, 716 pivot downwardly to lower the roller 704 and the slide-out room in the elevation direction. Conversely and as shown in FIGS. 36 and 37, as the threaded shaft 706 rotates in the opposite direction, the support blocks 708, 718 move toward each other and the links 712, 716 pivot upwardly to raise the roller 704 and the slide-out room in the elevation direction.

The support mechanism 702 is relatively stable compared to other similar mechanisms that do not include gear tooth surfaces (i.e., those in which the second support block 718 is fixed relative to the base 710).

Referring to FIGS. 40-43, another embodiment of a flush floor support mechanism 802 is shown (the vehicle 10 mounts two mechanisms 802, although only one of which is shown). The support mechanisms 802 are disposed between the floor of the vehicle and the floor of the slide-out room. The support mechanisms 802 are generally identical except for possibly being disposed in mirrored relation to one another. As such, only one support mechanism 802 will be described below for simplicity.

The support mechanism 802 includes a roller 804 that is moved in the elevation direction to move the slide-out room in the elevation direction. The roller 804 is moved via an elevating mechanism that includes a prime mover (not shown), such as a DC motor connected to a speed-reducing gearbox. The prime mover drives a threaded shaft 806 that in turn translatably drives a first support block 808 along a base 810 (see FIGS. 41 and 43).

Figure 41:
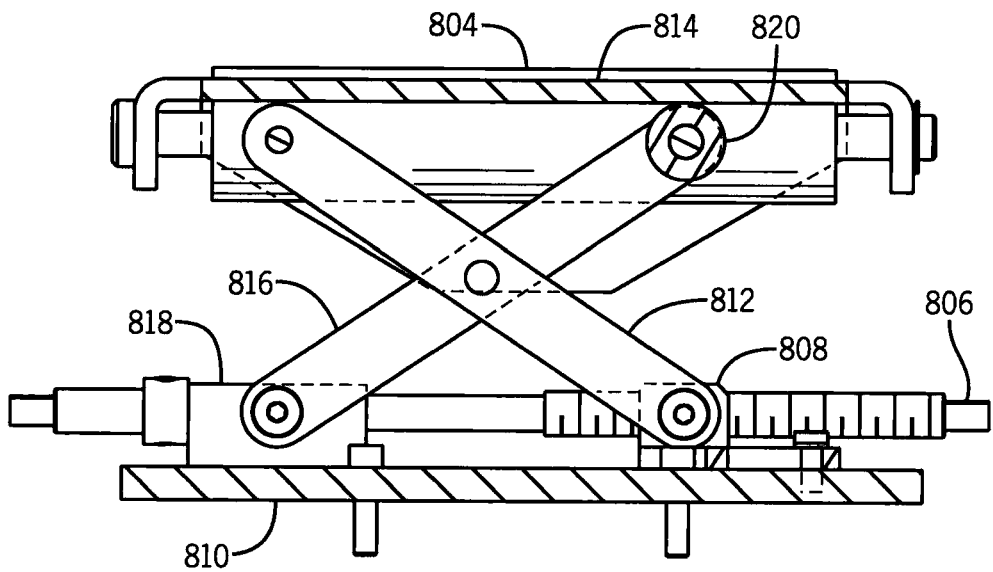
FIG. 41 is a side view of the support mechanism along line 41-41 of FIG. 40.

The first support block 808 pivotally mounts first links 812 that pivotally connect to a roller mounting bracket 814 opposite the first support block 808. Between their connection points to the first support block 808 and the roller mounting bracket 814, the first links 812 also pivotally connect to second links 816. At a first end, the second links 816 connect to a second support block 818 fixed to the base 810. As shown in the figures, the threaded shaft 806 may extend through and be rotatably supported by the second support block 818. At a second end, the second links 816 rotatably mount wheels 820 (one of which is shown in FIGS. 41 and 43) that engage a lower surface of the roller mounting bracket 814.

Figure 40:
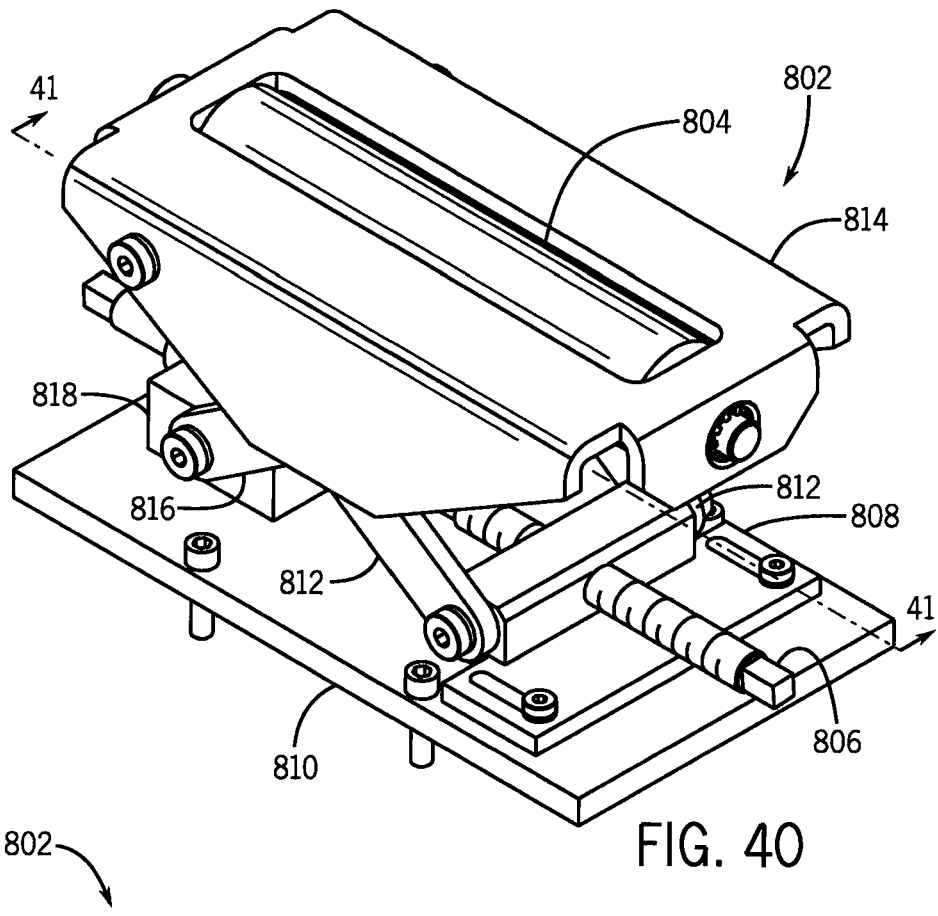
FIG. 40 is a perspective view of another embodiment of a support mechanism supporting the slide-out room of FIG. 1 in an elevated position.
Figure 42:
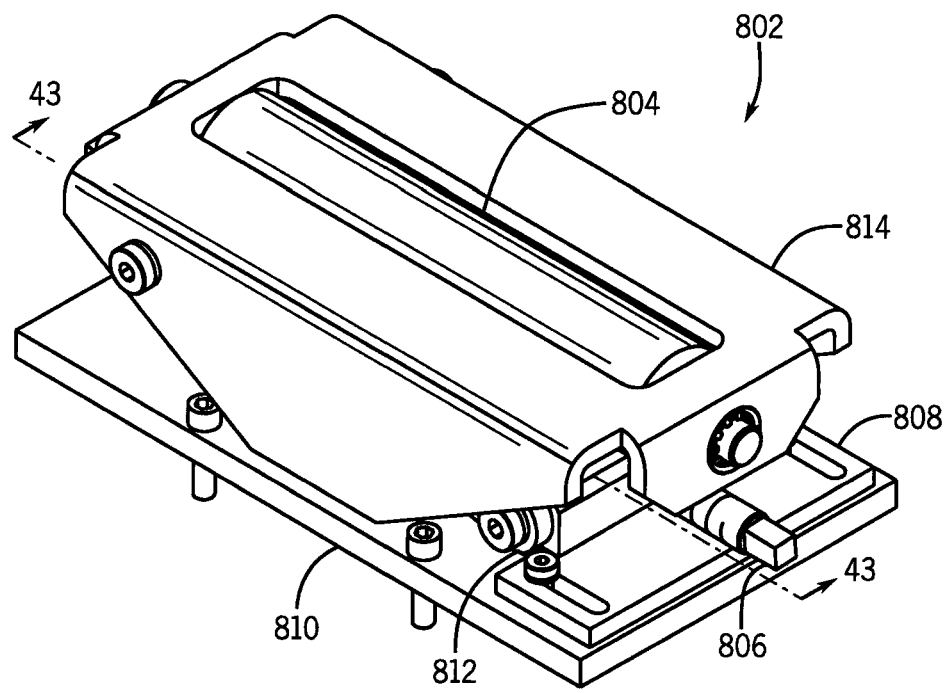
FIG. 42 is a perspective view of the support mechanism of FIG. 40 in a lowered position.
Figure 43:
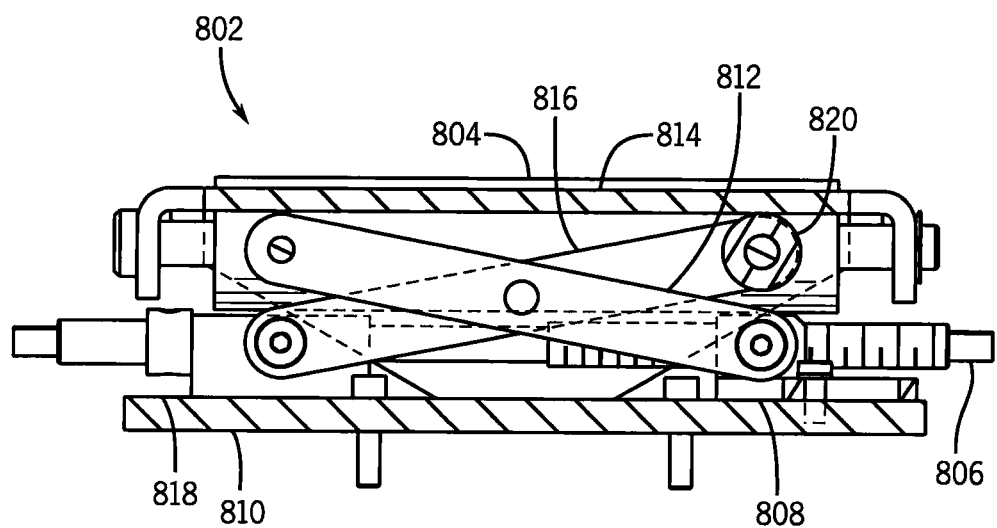
FIG. 43 is a side view of the support mechanism along line 43-43 of FIG. 42.

As shown in FIGS. 42 and 43, as the threaded shaft 806 rotates in one direction, the first support block 808 moves away from the second support block 818 and the links 812, 816 pivot toward a horizontal configuration to lower the roller 804 and the slide-out room in the elevation direction. Conversely and as shown in FIGS. 40 and 41, as the threaded shaft 806 rotates in the opposite direction, the first support block 808 moves toward the second support block 818 and the links 812, 816 pivot toward a vertical configuration to raise the roller 804 and the slide-out room in the elevation direction.

The slide-out system may also be modified in other manners that are not explicitly described herein. For example, instead of including float inhibiting mechanisms, the prime mover may be sufficiently powerful to firmly compress the seals in the retracted position and inhibit the slide-out room from floating in the transverse direction due to friction forces between the seals and the vehicle wall alone. Whether float inhibiting mechanisms are used or not in combination with the seals, it might be advantageous to apply a brake to the mechanism, preferably acting on the motor output shaft so the brake has the benefit of the gear reduction drive train to keep the room stationary. The brake would come on when the motor was turned off, to keep the seals compressed, and if a float inhibiting mechanism is used, to keep it engaged.

From the above, it should be apparent that the slide-out system according to the present invention provides a transversely floating drive mechanism that facilitates use of components or features that inhibit the slide-out room from shifting as the vehicle moves. Furthermore, in some embodiments, these mechanisms do not support the weight of the slide-out room and are configured to move or float vertically relative to the vehicle. This motion permits the slide-out room to descend near the extended position and act as a flush floor slide-out room.

It is specifically intended that the present invention not be limited to the embodiments and illustrations contained herein, but include modified forms of those embodiments including portions of the embodiments and combinations of elements of different embodiments as defined within the scope of the following claims.

What is claimed is:

1. An apparatus for moving a slide-out room disposed in an aperture of a side wall of a vehicle from a retracted position to an extended position in a drive direction of the slide-out room, the apparatus comprising:
   a drive assembly supported by the side wall of the vehicle; and
   a driven assembly driven by the drive assembly, the driven assembly being connected to a wall of the slide-out room such that 1) the slide-out room moves with the driven assembly generally horizontally from the retracted position to the extended position in the drive direction, and 2) the driven assembly is movable in a generally vertical direction transverse to the drive direction relative to the wall of the vehicle;
   wherein the driven assembly is moved in said generally vertical direction from an upper position to a lower position prior to the slide-out room reaching a fully extended lower position.

2. The apparatus of claim 1, wherein the room is moved from the retracted position to a fully extended upper position and thereafter is retracted to a partially extended position at which it is stopped and said driven assembly is then moved in said generally vertical direction from said upper position to said lower position.

3. The apparatus of claim 1, wherein the slide-out room is moved from the retracted position to a partially extended upper position at which horizontal motion of the slide-out room is stopped and while stopped in horizontal motion the room is moved in said generally vertical direction from said upper position to said lower position and thereafter the room is moved to said fully extended lower position.

4. A flush floor slide-out room operating mechanism in which in moving from full retraction at an upper level to full extension at a lower level the slide-out room is adapted to be stopped at a partially extended position at the upper level, and while the extension is stopped the room is lowered to the lower level, following which the room is further extended at the lower level.

5. The flush floor slide-out room operating mechanism as claimed in claim 4, wherein the room first passes by the partially extended position at which the room is lowered in going from retraction to extension and after passing said partially extended position the room is stopped, and thereafter retracted to return to said partially extended position and stopped in horizontal motion, and the room is then lowered.

6. The flush floor slide-out room operating mechanism as claimed in claim 4, wherein a distance from the partially extended position to a fully extended position of the room can be adjusted.

7. The flush floor slide-out room operating mechanism as claimed in claim 4, further comprising a lifting and lowering mechanism under a floor of the room that changes the elevation of the room between the upper and lower levels.

8. An apparatus as claimed in claim 1, wherein the drive assembly includes a drive support along a side of the room and the drive support moves generally vertically with the room.

9. An apparatus as claimed in claim 1, wherein the drive assembly includes a pinion that moves generally vertically with the room.

10. An apparatus as claimed in claim 9, wherein the pinion has an axis that is generally vertical.

11. An apparatus for moving a slide-out room disposed in an aperture of a side wall of a vehicle from a retracted position to an extended position in a drive direction of the slide-out room, the apparatus comprising:
    a drive assembly supported by the side wall of the vehicle; and
    a driven assembly driven by the drive assembly, the driven assembly being connected to a wall of the slide-out room such that 1) the slide-out room moves with the driven assembly generally horizontally from the retracted position to the extended position in the drive direction, and 2) the driven assembly is movable in a generally vertical direction transverse to the drive direction relative to the wall of the vehicle;
    wherein the driven assembly is moved in said generally vertical direction from an upper position at full retraction to a lower position at full extension.

12. The apparatus as in claim 11, wherein said driven assembly is moved vertically between the upper position and the lower position while horizontal movement of said room is stopped.

13. The apparatus as claimed in claim 11, wherein the drive assembly includes a drive support along a side of the room that moves generally vertically with the room.

14. The apparatus as claimed in claim 11, wherein the drive assembly includes a pinion that moves generally vertically with the room.

15. The apparatus as claimed in claim 13, wherein the pinion has an axis that is generally vertical.

16. The apparatus as claimed in claim 11, wherein the apparatus compensates for variations in spacing between the wall of the slide-out room and a perimeter of an opening in the side wall of the vehicle in which the slide-out room moves that occur as the slide-out room moves.

17. A method of moving a slide-out room of a vehicle comprising the steps of: extending the slide-out room from a fully retracted position at an upper level to an extended position at the upper level;
    stopping extension of the slide-out room at the extended position at the upper level;
    lowering the slide-out room at the extended position from the upper level to a lower level and terminating lowering at the lower level;
    extending the slide-out room at the lower level to a fully extended position at the lower level; and
    stopping extension of the slide-out room at the fully extended position at the lower level.

18. A method as claimed in claim 17, wherein the method is practiced on a slide-out room that has driven mechanisms attached to side walls of the slide-out room and a drive mechanism attached to edges of an opening in a sidewall of the vehicle, wherein the drive mechanism includes a gear rack and the drive mechanism includes a pinion, and wherein the gear rack and the pinion move together vertically as the room moves between the upper and lower levels.

19. The method as claimed in claim 18, wherein the pinion slides along a drive shaft as the pinion moves vertically with the gear rack.

20. The method as claimed in claim 19, wherein a drive support block holds the gear rack in engagement with the pinion as the rack extends and retracts and as the rack and pinion move between the upper and lower levels.

21. The method as claimed in claim 20, wherein the drive support moves with the pinion and rack between the upper and lower levels.

22. The method as claimed in claim 17, wherein the gear rack can move toward and away from the sidewall of the slide-out room while the gear rack is being extended and retracted and changed in level.

23. The method as claimed in claim 17, further comprising the steps of:
- retracting the slide-out room at the lower level to a partially extended position at the lower level;
- stopping retraction of the slide-out room at the partially extended position at the lower level;
- raising the slide-out room from the lower level to the upper level at the partially extended position and terminating raising at the upper level;
- retracting the slide-out room at the upper level from the partially extended position to the fully retracted position at the upper level; and
- stopping retraction of the slide-out room at the fully retracted position at the upper level.

24. A method of moving a slide-out room of a vehicle comprising the steps of:
- extending the slide-out room from a fully retracted position at an upper level to a fully extended position at the upper level;
- stopping extension of the slide-out room at the fully extended position at the upper level;
- retracting the slide-out room to a partially extended position at the upper level;
- stopping retraction of the room at the partially extended position at the upper level;
- lowering the slide-out room at the partially extended position from the upper level to a lower level;
- terminating lowering of the slide-out room at the partially extended position at the lower level;
- extending the slide-out room at the lower level to the fully extended position at the lower level; and
- stopping extension of the slide-out room at the fully extended position at the lower level.

\* \* \* \* \*